United States Patent
Yamanaka et al.

(10) Patent No.: US 11,221,789 B2
(45) Date of Patent: Jan. 11, 2022

(54) SEMICONDUCTOR DEVICE, MEMORY CONTROLLER, AND MEMORY ACCESSING METHOD

(71) Applicant: RENESAS ELECTRONICS CORPORATION, Tokyo (JP)

(72) Inventors: Sho Yamanaka, Tokyo (JP); Nobuhiko Honda, Tokyo (JP); Takahiro Irita, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 13 days.

(21) Appl. No.: 16/685,178

(22) Filed: Nov. 15, 2019

(65) Prior Publication Data
US 2020/0201559 A1 Jun. 25, 2020

(30) Foreign Application Priority Data
Dec. 25, 2018 (JP) .............................. JP2018-240740

(51) Int. Cl.
*G06F 3/06* (2006.01)
*G06F 11/10* (2006.01)

(52) U.S. Cl.
CPC .......... *G06F 3/0653* (2013.01); *G06F 3/0602* (2013.01); *G06F 3/064* (2013.01);
(Continued)

(58) Field of Classification Search
CPC ...... G06F 3/0653; G06F 3/0602; G06F 3/064; G06F 3/0619; G06F 3/0659; G06F 11/1048; G06F 11/1044
See application file for complete search history.

(56) References Cited

U.S. PATENT DOCUMENTS

| 5,182,752 A * | 1/1993 | DeRoo ............... G06F 11/08 714/758 |
| 2011/0258354 A1* | 10/2011 | Wang .................. G06F 13/161 710/114 |

(Continued)

FOREIGN PATENT DOCUMENTS

| JP | 10-232789 A | 9/1998 |
| JP | 2011-154551 A | 8/2011 |

OTHER PUBLICATIONS

Wikipedia, Shared memory, Dec. 2, 2017, Wikipedia, as preserved by the Internet Archive on Dec. 2, 2017, pp. 1-5 https://web.archive.org/web/20171202180015/https://en.wikipedia.org/wiki/Shared_memory (Year: 2017).*

*Primary Examiner* — Reginald G Bragdon
*Assistant Examiner* — Curtis James Kortman
(74) *Attorney, Agent, or Firm* — McDermott Will & Emery LLP

(57) ABSTRACT

When a plurality of write data is merged to generate a code for protecting data stored in the main memory, the write data is protected in the memory controller. A first code generation unit generates a first code based on the write data stored in a first sub memory, and stores the generated first code in a second sub memory. The sub memory controller reads the write data to be merged from the first sub memory, and verifies whether the read write data includes an error by using the first code stored in the second sub memory. When the read write data does not include an error, the sub memory controller merges valid data of the write data read from the first sub memory, and outputs the merged data to a second code generation unit. The second code generation unit generates a second code based on the merged data.

16 Claims, 16 Drawing Sheets

(52) U.S. Cl.
CPC .......... *G06F 3/0619* (2013.01); *G06F 3/0659* (2013.01); *G06F 3/0671* (2013.01); *G06F 11/1048* (2013.01)

(56) References Cited

U.S. PATENT DOCUMENTS

| | | | |
|---|---|---|---|
| 2015/0012705 A1* | 1/2015 | Holmqvist | G06F 11/1004 711/118 |
| 2016/0378595 A1* | 12/2016 | Rho | H03M 13/152 714/764 |
| 2017/0063401 A1* | 3/2017 | Jeganathan | G06F 11/1048 |
| 2020/0104072 A1* | 4/2020 | Ngu | G06F 3/061 |

* cited by examiner

SEMICONDUCTOR DEVICE, MEMORY CONTROLLER, AND MEMORY ACCESSING METHOD

CROSS-REFERENCE TO RELATED APPLICATIONS

The disclosure of Japanese Patent Application No. 2018-240740 filed on Dec. 25, 2018 including the specification, drawings and abstract is incorporated herein by reference in its entirety.

BACKGROUND

The present invention relates to a semiconductor device, a memory controller, and a memory access method, and for example, to a semiconductor device for storing in a memory data to which codes for detecting error detection of data are added, a memory controller, and a memory access method.

As mechanisms for protecting data written into memories, code error correction using an error correction code (ECC) for detecting error detection and correction of the data is known. In the code error correction, for example, ECC of predetermined data width such as 1 byte are generated for data of predetermined units such as 8 bytes. When an error of a predetermined number of bits occurs in the data, the error can be corrected by using ECC.

Here, when the number of bits of the data to be written into the memory is smaller than the generation unit of ECC, ECC cannot be generated only by the data written into the memory. In order to generate ECC, it is required to perform read-modify-write (RMW) for reading data stored in the memory and merging the read data with data to be written into the memory. However, when the read-modify-write is performed, it is necessary to read the data from the memory once before writing the data into the memory, so that the access efficiency is deteriorated.

Regarding ECC, Japanese unexamined Patent Application publication No. 2011/154551 discloses a memory device having an error detection and correction device. The memory device described in Japanese unexamined Patent Application publication No. 2011/154551 includes a code generation unit that generates ECC for each data, and a detection correction unit that detects or corrects errors in the data using ECC. When the number of bits of data to be written into the memory is equal to the number of bits of data width of the memory, the code generation unit generates ECC using the data. The code generation unit also generates flag information indicating that the ECC is valid and check information for parity check of the flag information.

In the memory device described in Japanese unexamined Patent Application publication No. 2011/154551, when the number of bits of data to be written into the memory is smaller than the number of bits of the data width of the memory, the code generation unit generates a dummy ECC code. In addition, the code generation unit generates flag information indicating that the dummy ECC is not a code used for error detection and correction, and check information for parity check of the flag information. The detection and correction unit refers to the flag information, and when the ECC is not a dummy, performs error detection and correction using the ECC for the data read from the memory. The detection and correction unit does not perform error detection and correction when the ECC is dummy.

Regarding ECC, Japanese unexamined Patent Application publication No. Hei 10 (1998)/232789 discloses an ECC partial write control unit that controls partial write to write data having a data width smaller than a data width to be a target of check bit generation such as ECC. In the ECC control unit described in Japanese unexamined Patent Application publication No. Hei 10 (1998)/232789, the write data having a data width smaller than a data width to be a target of check bit generation is stored in the write buffer.

When the write buffer stores data within an address range which is a target of check bit generation, and the sum of the data widths of the plurality of write data stored in the write buffer equals to a data width with which the ECC generation unit can generate a check bit, the multiplexer merges the plurality of write data stored in the write buffer. On the other hand, when the data width of the plurality of write data stored in the write buffer is smaller than the data width to be a target of the check bit generation, the data read from the memory is stored in the read buffer. In this case, the multiplexer merges the write data in the write buffer and the data in the read buffer. The ECC generation unit generates check bit for the data merged by the multiplexer.

SUMMARY

In Japanese unexamined Patent Application publication No. 2011/154551, when the number of bits of data to be written into the memory is smaller than the number of bits of the data width of the memory, a dummy ECC is generated. In this case, although the read-modify-write can be omitted, the error correction cannot be performed for the data to which the dummy ECC is added, and the data stored in the memory is not protected. For example, if the data to be written into the memory is important data, it may not be acceptable to protect the data. In this case, it is necessary to perform read-modify-write in order to protect the data.

In Japanese unexamined Patent Application publication No. Hei 10 (1998)/232789, when the number of bits of the write data is smaller than the number of bits of the generation unit of ECC, the write data is written into the write buffer, and a plurality of write data written into the write buffer are merged to generate ECC. In this way, data can be protected while omitting the read-modify-write. However, in Japanese unexamined Patent Application publication No. Hei 10 (1998)/232789, the data written into the write buffer is not protected. There is a possibility that the contents of the data written once into the write buffer are rewritten before being merged. Then, there is a problem that data cannot be written correctly into the memory.

Other objects and novel features will become apparent from the description of this specification and the accompanying drawings.

According to an embodiment, the semiconductor device comprises a memory controller. The memory controller stores the write data including the valid data in the first sub memory and stores the first code generated for the write data and for detecting error detection of the data in the second sub memory. When there are a plurality of write requests for the same address, the memory controller determines whether data having a predetermined data width, which is a generation unit of the second code for detecting error detection of data, can be obtained by merging the valid data in the write data of the plurality of write requests. When determining that the data having a predetermined data width can be obtained, the memory controller reads the write data to be merged from the first sub memory and verifies whether the read write data includes an error using the first code. When the read write data does not include an error, the memory controller merges the valid data in the write data read from the first sub memory and generates a second code for the merged data. The memory controller issues a command to write the data obtained by adding the second error code to the merged data into the main memory.

According to the above-described embodiment, when a code for detecting error detection of data is generated to protect data to be stored in the main memory by merging a plurality of write data, the write data can be protected in the memory controller.

DETAILED DESCRIPTION

Figure 1:
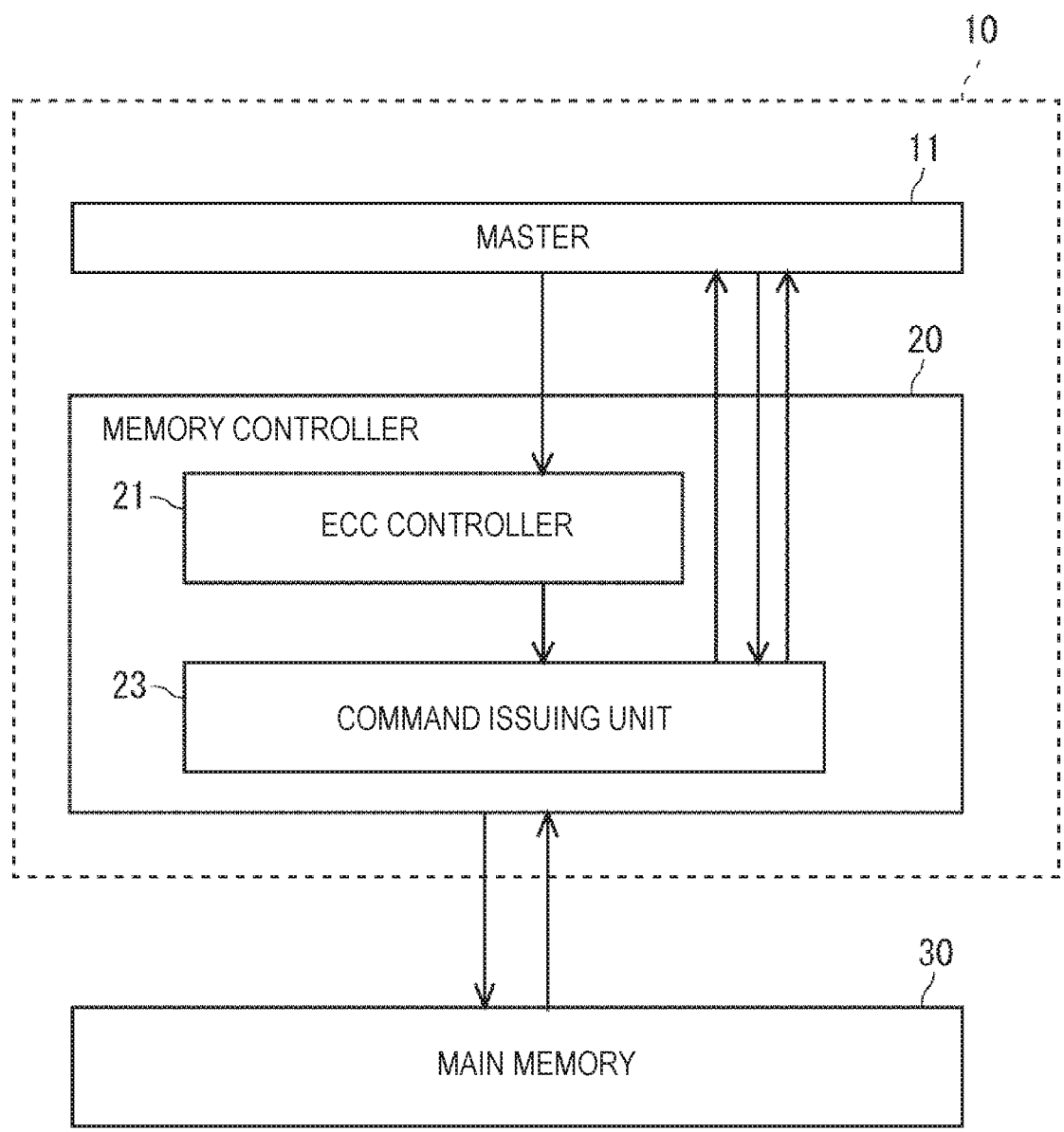
FIG. 1 is a block diagram showing a semiconductor device according to a first embodiment.

Prior to the description of the embodiments, the background reading to the following embodiments will be described. In a semiconductor device particularly for in-vehicle applications, data is protected by writing ECC correspond to the data into DDR (Double-Data-Rate) memory. In semiconductor device, for example, 1 byte ECC are generated for 8 byte data. At this time, if data is smaller than 8 bytes, ECC cannot be generated only for the data. In the above-mentioned particular semiconductor device, regarding data for which ECC cannot be generated, ECC is not generated and the data is not protected.

However, from the viewpoint of functional security and protection, it is also necessary to protect data smaller than the 8 bytes for which ECC cannot be generated. ECC can be generated by executing read-modify-write for the data smaller than 8 bytes. In that case, however, significant performance degradation occurs. The inventors of the present invention have studied a semiconductor device capable of improving reliability of the data protection while omitting the read-modify-write as much as possible. As a result of the consideration, the inventors arrived at the embodiments to be described below.

Hereinafter, the embodiments to which means for solving the above problems is applied will be described in detail below with reference to the drawings. For clarity of explanation, the following description and drawings are appropriately omitted and simplified. In addition, the elements described in the drawings as functional blocks for performing various processes can be configured as CPU (Central Processing Unit), memories, and other circuits in terms of hardware, and are realized by programs loaded into the memories in terms of software. Therefore, it is understood by those skilled in the art that these functional blocks can be realized in various forms by hardware alone, software alone, or a combination thereof, and the present invention is not limited to any of them. In the drawings, the same elements are denoted by the same reference numerals, and a repetitive description thereof is omitted as necessary.

Also, the programs described above may be stored and provided to a computer using various types of non-transitory computer readable media. Non-transitory computer readable media includes various types of tangible storage media. Examples of non-transitory computer-readable media include magnetic recording media (e.g., flexible disks, magnetic tapes, hard disks), magneto-optical recording media (e.g., magneto-optical disks, CD-ROM (Compact Disk-Read Only Memory), CD-R (recordable), CD-R/W (ReWritable, and semi-conductor memories (e.g., masked ROM, PROM (Programmable ROM), EPROM (Erasable PROM, flash ROM, RAM (Random Access Memory)). The program may also be supplied to the computer by various types of transitory computer-readable media. Examples of transitory computer-readable media include electrical signals, optical signals, and electromagnetic waves. The transitory computer readable medium may provide the program to the computer via wired or wireless communication paths, such as electrical wires and optical fibers.

The present invention will be described using the following embodiments while being divided into a plurality of sections or embodiments if necessary for convenience sake. However, except for a case especially specified, the sections or embodiments are not irrelevant to each other, and one has a relationship as a part or all of a modified example, an application, a detailed explanation, or a supplementary explanation of the other. In the following embodiments, the number of elements, etc. (including the number of elements, numerical values, quantities, ranges, etc.) is not limited to the specific number, but may be not less than or equal to the specific number, except for cases where the number is specifically indicated and is clearly limited to the specific number in principle.

Furthermore, in the following embodiments, the constituent elements (including the operation steps and the like) are not necessarily essential except in the case where they are specifically specified and the case where they are considered to be obviously essential in principle. Similarly, in the following embodiments, when referring to the shapes, positional relationships, and the like of components and the like, it is assumed that the shapes and the like are substantially approximate to or similar to the shapes and the like, except for the case in which they are specifically specified and the case in which they are considered to be obvious in principle, and the like. The same applies to the above-mentioned numbers and the like, including the number, the numerical value, the amount, the range, and the like.

First Embodiment

FIG. 1 shows a semiconductor device according to a first embodiment. The semiconductor device 10 includes a master 11 and a memory controller 20. The master 11 issues an access request to the main memory 30. The master 11 is a bus master and is configured as a processor such as a CPU or a GPU (Graphics Processing Unit). The main memory 30 is configured as a memory device such as a DDR-SDRAM (Synchronous Dynamic Random Access Memory), for example. The access request to the main memory 30 includes, for example, an access type indicating read or write, information indicating address information of an access destination, and the like. Hereinafter, the access request whose access type is write may be referred to as a write request, and the access request whose access type is read may be referred to as a read request.

The memory controller 20 is coupled to the master 11 via a bus or the like, and accesses the main memory 30 in accordance with an access request received from the master 11. The memory controller 20 includes an ECC controller 21 and a command issuing unit 23. The ECC controller 21 receives write requests from the master, and adds ECC, which is a code for error detection and correction, to data to be written into the main memory 30 in accordance with the write request.

The command issuing unit 23 issues a command (write command) to write the data to which ECC is added into the main memory 30. The command issuing unit 23 returns a response to the write command to the master 11. In addition, the command issuing unit 23 receives a read request from the master 11 and issues a command (read command) to read data from the main memory 30 in accordance with the received read request. The command issuing unit 23 returns a response to the read command including the read data to the master 11. The command issuing unit 23 also performs scheduling for write requests and read requests.

<Memory Controller>

Figure 2:
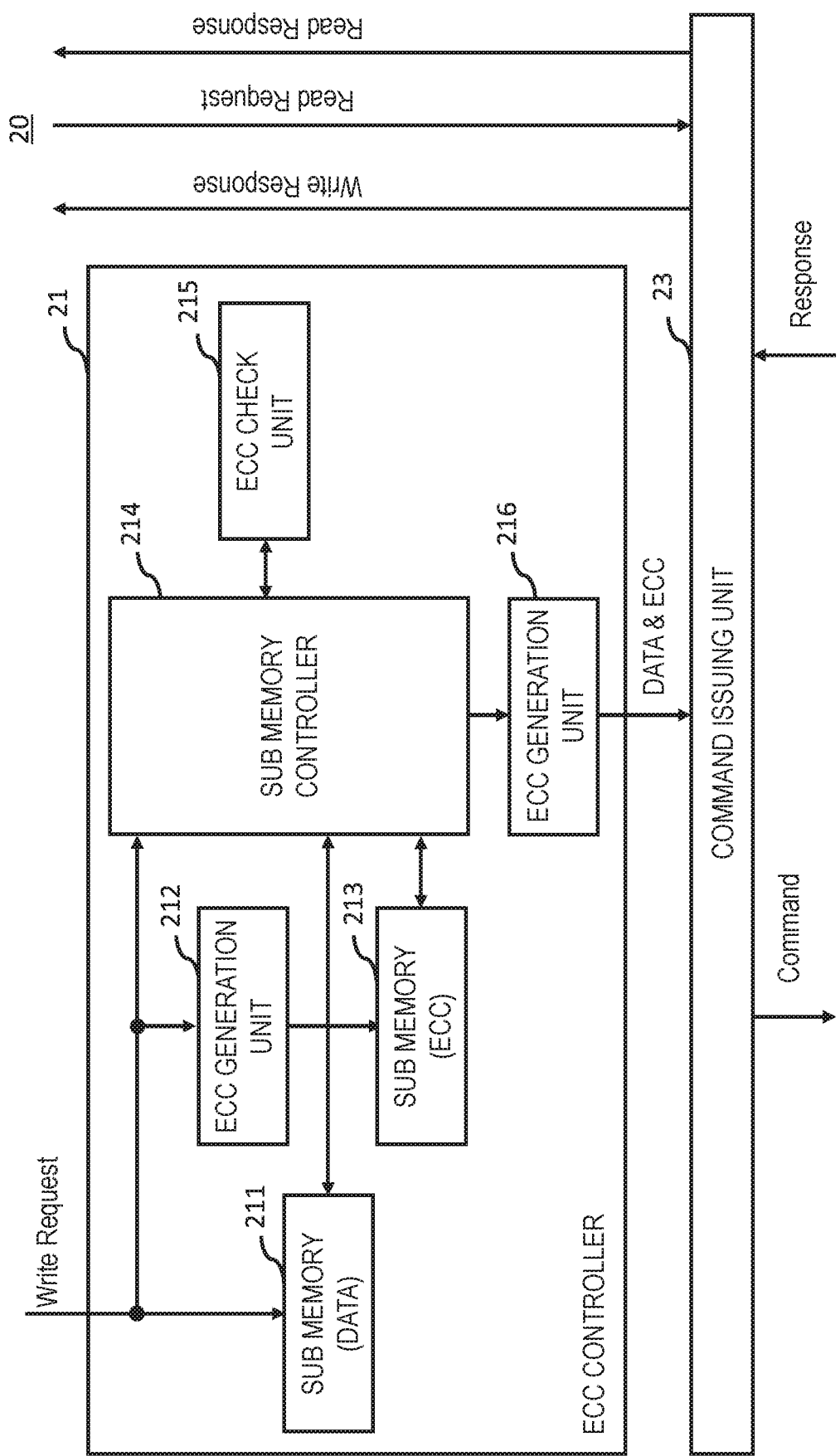
FIG. 2 is a block diagram showing a configuration example of the ECC controller.

FIG. 2 shows a configuration example of the ECC controller 21. The ECC controller 21 includes a sub memory 211, an ECC generation unit 212, a sub memory 213, a sub memory controller 214, an ECC check unit 215, and an ECC generation unit 216. In the ECC controller 21, for example, the ECC generation unit 212, the ECC check unit 215, and the ECC generation unit 216 may be configured as hardware circuits. The sub memory controller 214 may be configured with a circuit including a processor.

The sub memory 211 stores write data including valid data, which is written into the main memory 30 in accordance with the write request. The ECC generation unit 212 generates ECC based on the write data stored in the sub memory 211. The ECC generated by the ECC generation unit 212 is, for example, a code for correcting an error of a predetermined number of bits in the write data. In the present embodiment, it is assumed that even when invalid data is included in the write data, the ECC generation unit 212 generates ECC for the entire write data. The ECC generation unit 212 stores the generated ECC in the sub memory 213. As the sub memory 211 and 213, memory devices such as, for example, SRAM (Static RAM) are used. Note that the sub memory 211 and 213 do not necessarily have to be comprised of separate devices that are physically separated from each other.

The ECC check unit 215 obtains the write data stored in the sub memory 211 and the ECC stored in the sub memory 213 through the sub memory controller 214. The ECC check unit 215 is a write data verification unit, and verifies whether an error has occurred in the write data stored in the sub memory 211 using the ECC stored in the sub memory 213. The ECC check unit 215 outputs the verification result to the sub memory controller 214.

The ECC generation unit 216 obtains data to be written into the main memory 30 from the sub memory controller 214. The ECC generation unit 216 generates ECC based on the data to be written into the main memory 30 in units of predetermined data width. Here, the ECC generated by the ECC generation unit 212 is used to protect the write data in the sub memory 211. On the other hand, the ECC generated by the ECC generation unit 216 is used to protect data stored in the main memory 30.

The sub memory controller 214 manages address information of a write destination of write data stored in the sub memory 211 in the main memory 30. When there are a plurality of write requests for the same address in the main memory 30, the sub memory controller 214 determines whether data having a predetermined data width, which is an generation unit of ECC generated by the ECC generation unit 216, can be obtained by merging the valid data in the write data of the write requests.

For example, the sub memory 211 stores write data in separate entry for each write request. The sub memory controller 214 checks whether a plurality of write data having the same write destination address are stored in the sub memory 211. When a plurality of write data having the same write destination address are stored, the sub memory controller 214 determines whether data having a predetermined data width can be obtained by merging the valid data in the plurality of write data. When determining that the data having the predetermined data width can be obtained, the sub memory controller 214 reads the write data to be merged from the sub memory 211. The sub memory controller 214 outputs the read write data to the ECC check unit 215, and the ECC check unit 215 verifies whether the write data includes an error.

The ECC check unit 215 obtains the write data and ECC from the sub memory controller 214, and determines whether the write data includes an error. When determining that the write data includes an error, the ECC check unit 215 corrects the write data using ECC. When the write data can be corrected, the ECC check unit 215 outputs the corrected write data to the sub memory controller 214. When the write data cannot be corrected, the ECC check unit 215 outputs information that the write data includes an error to the sub memory controller 214. When the ECC check unit 215 determines that the write data includes an error, the sub memory controller 214 performs an error processing.

When the ECC check unit 215 determines that the write data does not include an error, the sub memory controller 214 merges the valid data in the data to be merged read from the sub memory 211, and outputs the merged data to the ECC generation unit 216. The ECC generation unit 216 generates ECC based on the merged data. The ECC generation unit 216 outputs the merged data and the generated ECC to the command issuing unit 23. The command issuing unit 23 generates a command to write data obtained by adding ECC to the merged data into the main memory 30, and outputs the command to the main memory 30. The main memory 30 writes the data obtained by adding ECC to the merged data to the address of the write destination in accordance with the output command.

<Operation Procedure>

Figure 3:
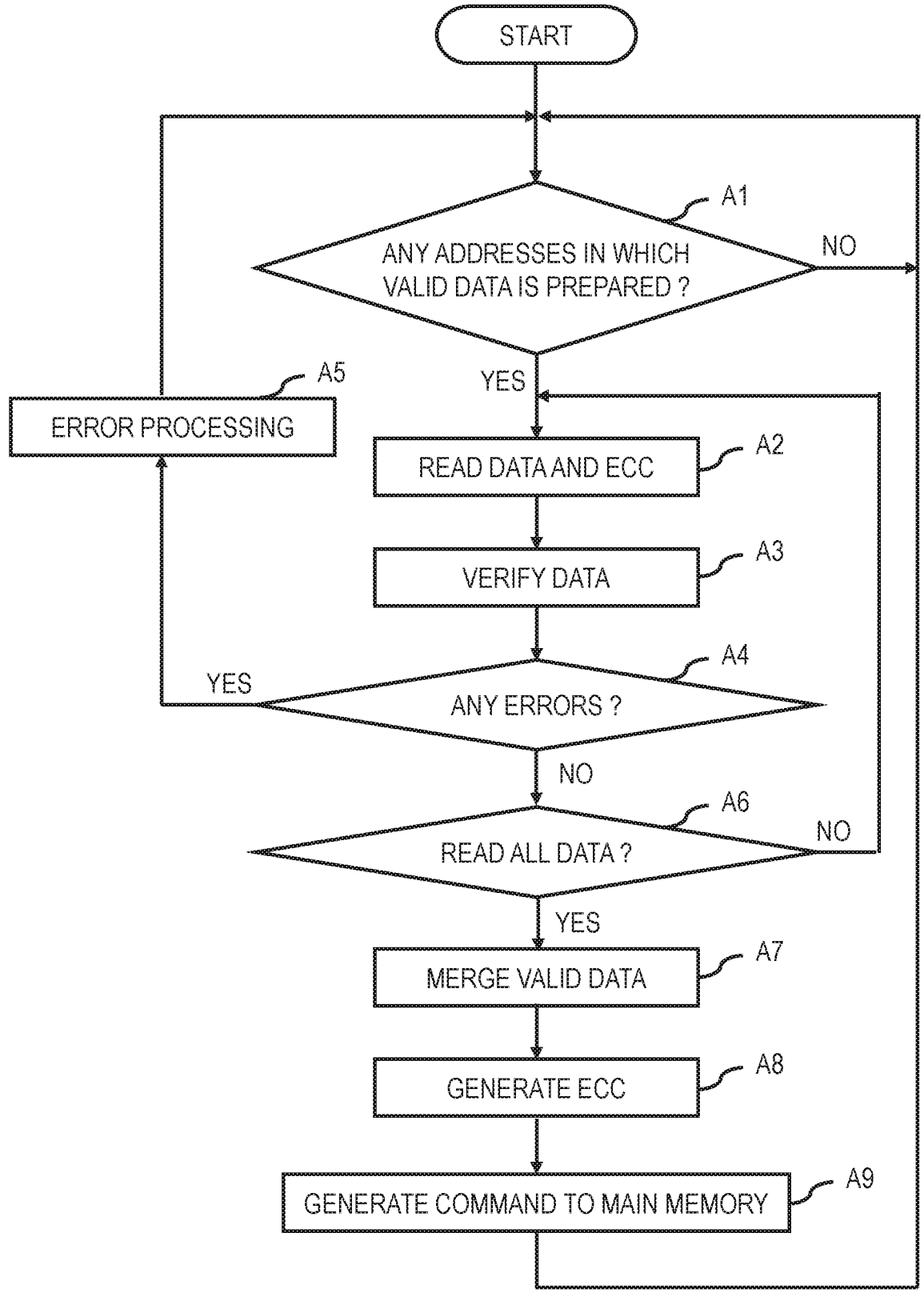
FIG. 3 is a flow chart showing the operation procedure when the master outputs a write request.

FIG. 3 shows an operation procedure when the master outputs a write request. The memory controller 20 receives a write request from the master 11 via the bus. The sub memory 211 in the memory controller 20 temporarily stores the write data. The ECC generation unit 212 generates ECC based on the write data and stores the generated ECC in the sub memory 213.

When the write request is received, the sub memory controller 214 refers to the sub memory 211 and determines whether there is an address of the main memory 30 in which the valid data is prepared (step A1). For example, in step A1, the sub memory controller 214 determines whether data having a predetermined data width, which is a generation unit of ECC in the ECC generation unit 216, is obtained when valid data in a plurality of write data having the same write destination address stored in the sub memory 211 are merged. When determining that data having a predetermined data width can be obtained by merging the valid data in a plurality of write data, the sub memory controller 214 determines that there is an address of the main memory 30 in which the valid data is prepared. The sub memory controller 214 also determines that there is an address of the main memory 30 in which the valid data is prepared when the way of writing data is not the partial write, that is, when the data width of the write data is equal to the predetermined data width.

When determining that there is an address of the main memory 30 in which the valid data is prepared in step A1, the sub memory controller 214 reads one write data to be merged from the sub memory 211, and reads ECC corresponding to the read write data from the sub memory 213 (step A2). The ECC check unit 215 verifies the write data read in step A2 using the ECC read in step A2 (step A3). When the write data includes an error and the error can be corrected using ECC, the ECC check unit 215 corrects the write data. The ECC check unit 215 outputs the verification result to the sub memory controller 214.

The sub memory controller 214 determines whether an error has occurred in the write data (step A4). If determining that an error has occurred, the sub memory controller 214 performs an error processing (step A5). For example, in step A5, the sub memory controller 214 requests the master 11 that issued the write request to retransmit the write request. When the write request is retransmitted, correct data can be written into the main memory 30. Alternatively, the sub memory controller 214 may read a part of data in which an error has occurred from the main memory 30 to compensate for the data, or may discard the write data in which the error has occurred. In these cases, it is possible to avoid writing the data in which an error has occurred into the main memory 30.

When determining that no error has occurred in the write data, the sub memory controller 214 determines whether all the write data of the addresses in which the valid data is prepared have been read (step A6). If determining that all the write data has not been read, the sub memory controller 214 returns to step A2 and reads the next write data and ECC from the sub memory 211 and 213. The sub memory controller 214 repeats steps A2 to A4 until determining that all the write data has been read in step A6.

When determining that all the write data has been read in step A6, the sub memory controller 214 merges the valid data in the read write data (step A7). The ECC generation unit 216 generates ECC based on the valid data merged in step A7 (step A8). The command issuing unit 23 generates a command to write data obtained by adding the ECC generated in step A8 to the valid data merged in step A7 into the main memory 30, and outputs the generated command to the main memory 30 (step A9).

<Operation Example>

Figure 4:
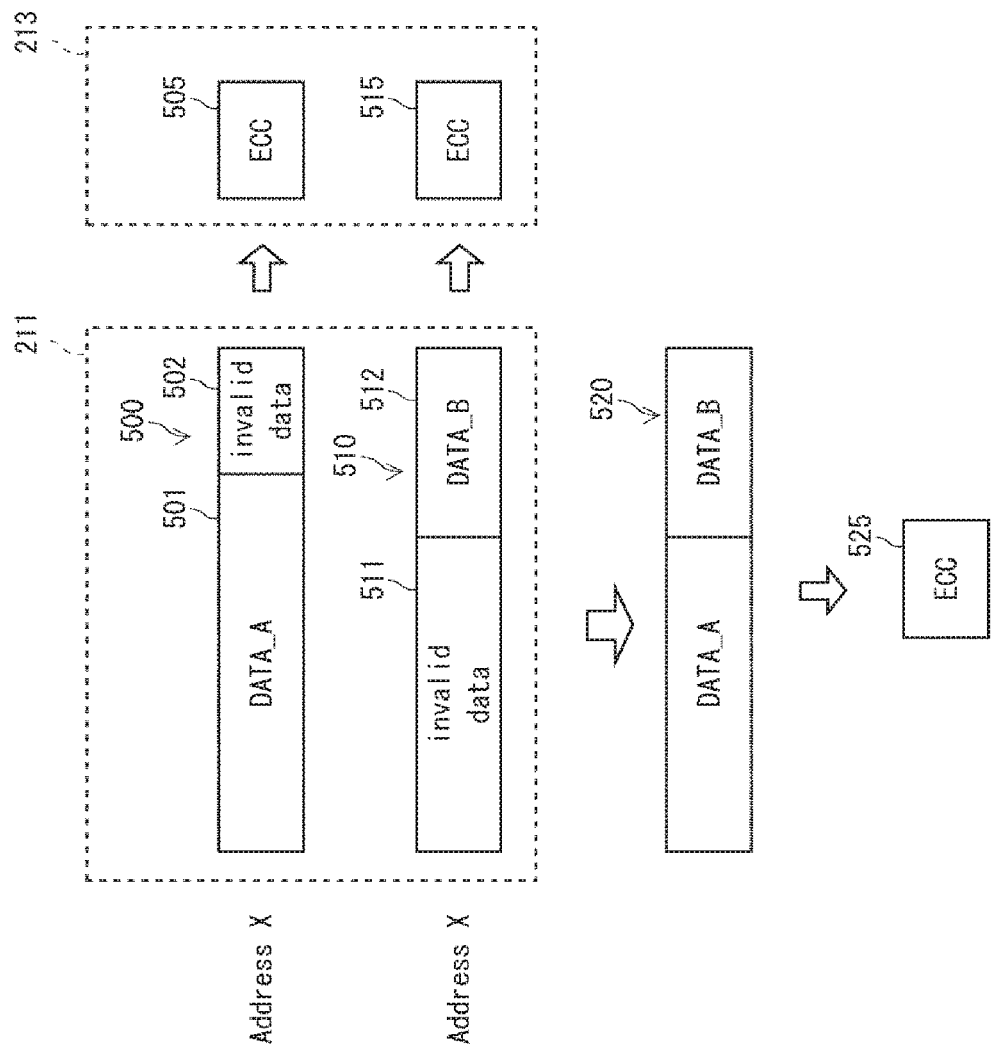
FIG. 4 is a schematic diagram showing two write data and a merged data.

Hereinafter, an operation example will be described. FIG. 4 schematically shows two write data and merged data. Here, it is assumed that the master 11 outputs a write request for writing the write data 500 to the address X of the main memory 30, and then outputs a write request for writing the write data 510 to the address X of the main memory 30. The write data 500 includes valid data (DATA_A) 501 and invalid data 502. The write data 510 includes invalid data 511 and valid data (DATA_B) 512.

The ECC controller 21 stores the write data 500 and 510 in the separate entry in the sub memory 211. The ECC generation unit 212 generates ECC 505 based on the write data 500, and stores ECC 505 in the sub memory 213. The ECC generation unit 212 generates ECC 515 based on the write data 510, and stores ECC 515 in the sub memory 213.

With respect to the address X, when merging the valid data 501 in the write data 500 and the valid data 512 in the write data 510, the sub memory controller 214 determines that data having a predetermined data width, which is a generation unit for ECC in the ECC generation unit 216, is obtained in step A1 of FIG. 3. In this case, the sub memory controller 214 reads the write data 500 from the sub memory 211 and reads ECC 505 from the sub memory 213 in step A2. The sub memory controller 214 verifies the write data 500 using ECC 505 in step A3.

When the write data 500 does not include errors, returning to A2, the sub memory controller 214 reads the write data 510 from the sub memory 211 and reads ECC 515 from the sub memory 213. The sub memory controller 214 verifies the write data 510 using ECC 515 in step A3.

When determining that the write data 510 does not include an error, the sub memory controller 214 merges the valid data 501 in the write data 500 and the valid data 512 in the write data 510 to generate data (write data) 520 in step A7. At this time, the data of the address where the valid data 501 and the valid data 512 are overlapped is overwritten with the valid data 512 in the write data 510, which is output later. The ECC generation unit 216 generates ECC 525 based on the write data 520 in step A8. The command issuing unit 23 generates a command to write data obtained by adding ECC 525 to the write data 520 into the main memory 30 in step A9.

In the present embodiment, the sub memory 211 stores write data of a write request, and the sub memory 213 stores ECC of the write data. When merging the valid data in the write data, the sub memory controller 214 determines whether the data necessary for generating ECC to be stored in the main memory 30 is prepared. When determining that the data necessary for generating ECC is prepared, the sub memory controller 214 read the write data to be merged from the sub memory 211 and then read ECC of the write data to be merged from the sub memory 213. The ECC check unit 215 verifies the write data stored in the sub memory 211 using the ECC read from the sub memory 213. When no error is included in the write data, the sub memory controller 214 merges the read valid data in the write data. The ECC generation unit 216 generates ECC for the merged data, and the command issuing unit 23 generates a command to write the merged data and ECC into the main memory 30.

In the present embodiment, when the write data including invalid data, for which ECC to be stored in the main memory 30 cannot be generated, is output from the master 11, the write data including invalid data is stored in the sub memory 211 without executing the read-modify-write. In the present embodiment, data having a predetermined data width necessary for generating ECC can be obtained by merging valid data in a plurality of write data. Therefore, the data in the main memory 30 can be protected even if the read-modify-write operation is omitted. In the present embodiment, the ECC generation unit 212 generates ECC for the write data stored in the sub memory 211, and the ECC check unit 215 verifies whether the write data stored in the sub memory 211 includes an error using the ECC generated by the ECC generation unit 212. In this way, the write data stored in the sub memory 211 can be protected in the memory controller 20.

Second Embodiment

Next, second embodiment will be described. The configuration of the semiconductor device according to the present embodiment may be the same as the configuration of the semiconductor device 10 according to the first embodiment shown in FIG. 1. The configuration of the ECC controller in the present embodiment may be the same as the configuration of the ECC controller 21 shown in FIG. 2. In the present embodiment, the write data includes a plurality of blocks, and the write request includes information indicating valid or invalid data, for each blocks of write data. In the present embodiment, the ECC generation unit 212 generates ECC for each block corresponding to the valid data in the write data.

In the present embodiment, the sub memory 211 stores the write data in separate entry for each write destination address in the main memory 30. Further, the sub memory 213 stores ECC in separate entry for each write destination address. When the write request is received, the sub memory controller 214 checks whether there is an entry in the sub memory 211 for storing write data of write destination address of the received write request. When there is no entry, the sub memory controller 214 creates a new entry in the sub memory 211 and stores the valid data portion in the write data in the entry. In this case, ECC for each block corresponding to the valid data generated by the ECC generation unit 212 is stored in the entry in the sub memory 213 corresponding to the newly generated entry.

When there is already an entry for storing write data of the write destination address of the write request, the sub memory controller 214 overwrites the data of the block corresponding to the valid data in the write data of the newly received write request, out of the write data stored in the entry, with the valid data. At this time, the ECC generation unit 212 overwrites ECC of the block corresponding to the valid data in the write data of the newly received write request, out of the ECC stored in the sub memory 213, with the generated ECC.

Figure 5:
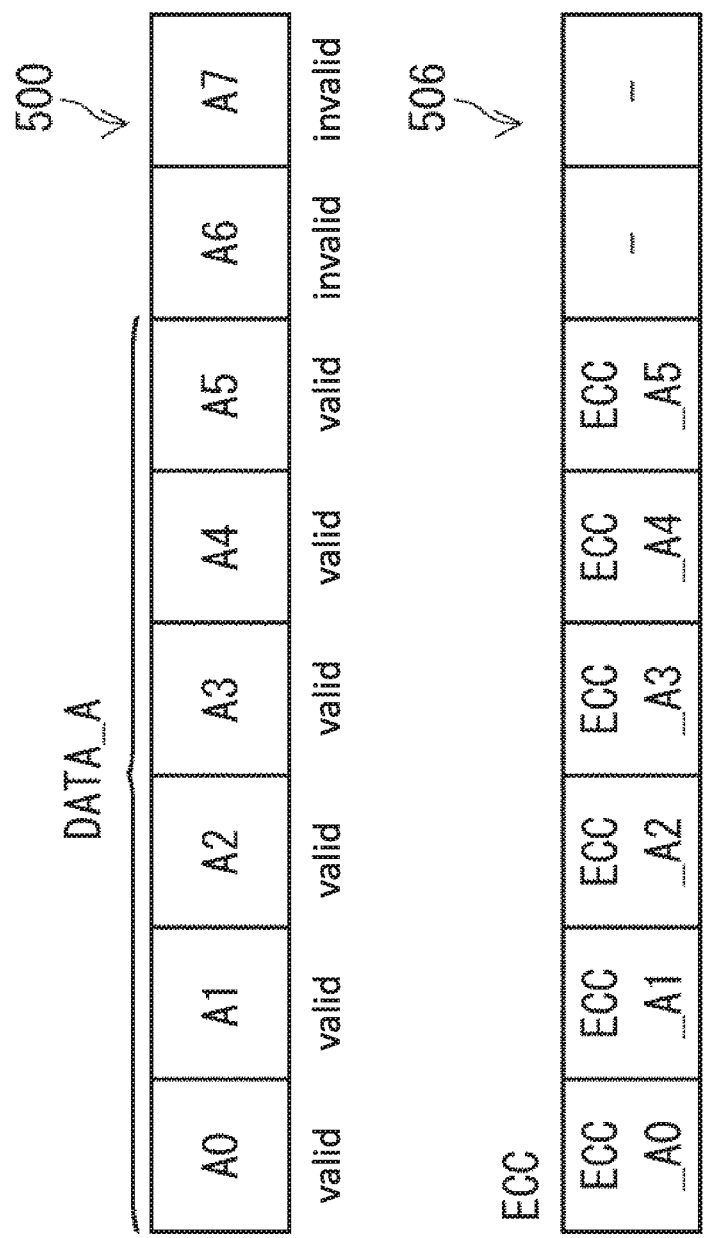
FIG. 5 is a schematic diagram showing an example of write data.

<Data Examples> the present embodiment is described below using specific examples. FIG. 5 shows an example of write data. The write data 500 includes, for example, a total of eight blocks. It is assumed that the data length of each block is 8 bits. A flag indicating validity or invalidity of data is set in each block. In the write data 500, the flags of the five blocks of the block 0 to 5 are set to "valid", and the flags of the block 6 and 7 are set to "invalid". In this case, out of the data A0 to A7 of each block of the write data 500, the data A0 to A6 constitute DATA_A which is valid data, and the data A6 and A7 constitute invalid data.

The ECC generation unit 212 generates a ECC 506 based on the write data 500. Like the write data 500, ECC 506 includes a total of eight blocks. The ECC generation unit 212 generates 5-bit ECC for 8-bit data of each block, for example. The ECC generation unit 212 generates 5-bit ECC_A0 to ECC_A5 for each block based on the data A1 to A5. The ECC generation unit 212 does not generate ECC for the data A6 and A7 which is invalid data. In this case, it is possible to verify whether the data A0 to A5 include an error and to correct the error by using the ECC_A0 to ECC_A5.

Figure 6:
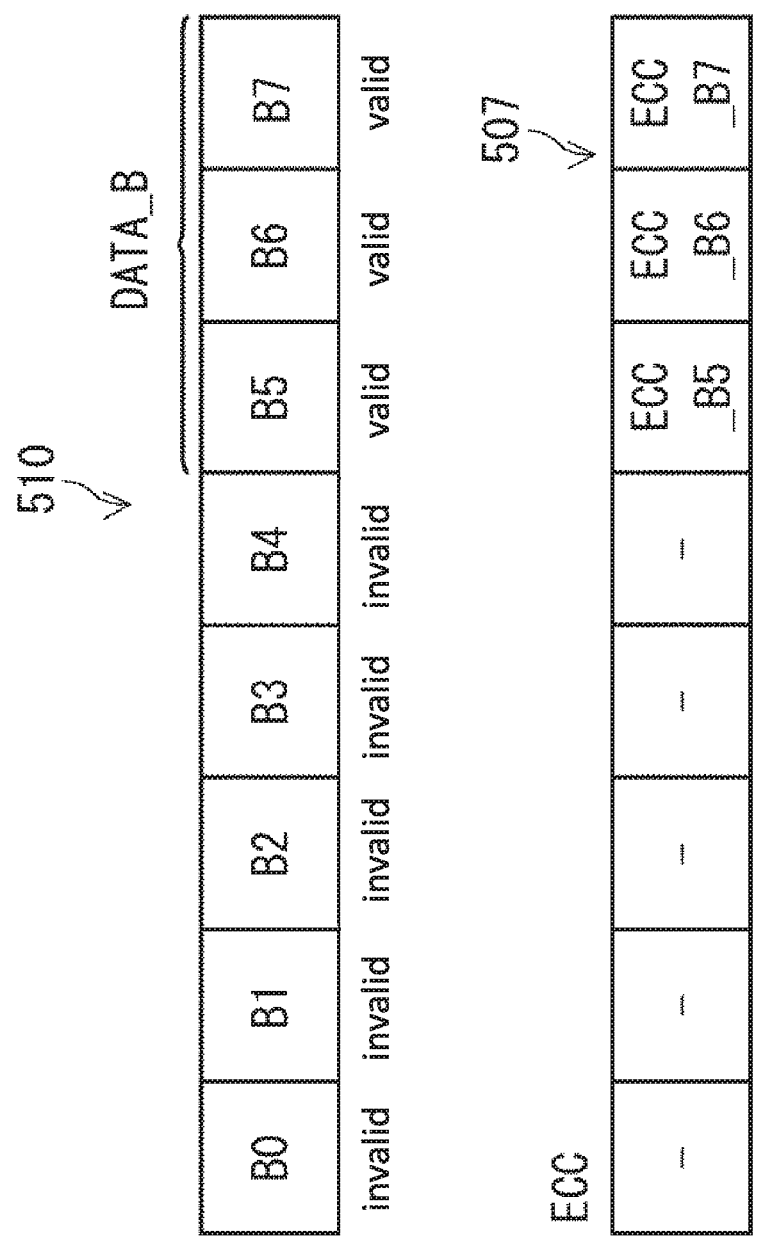
FIG. 6 is a schematic diagram showing another example of write data.

FIG. 6 shows another example of the write data. Like the write data 500, the write data 510 is divided into a total of eight blocks. In the write data 510, the flags of the five blocks of the block 0 to 4 are set to "invalid", and the flags of the block 5 to 7 are set to "valid". In this case, out of the data B0 to B7 of each block of the write data 510, the data B5 to B7 constitute DATA_B which is valid data, and the data B0 to B4 constitute invalid data.

The ECC generation unit 212 generates ECC 507 based on the write data 510. Like the write data 510, ECC 507 includes a total of eight blocks. The ECC generation unit 212 generates ECC_B5 to ECC_B7 for each block based on the data B5 to B7. The ECC generation unit 212 does not generate ECC for the data B0 to B4 which are invalid data. In this case, it is possible to verify whether the data B5 to B7 include an error and to correct the error by using the ECC_B5 to ECC_B7.

Figure 7:
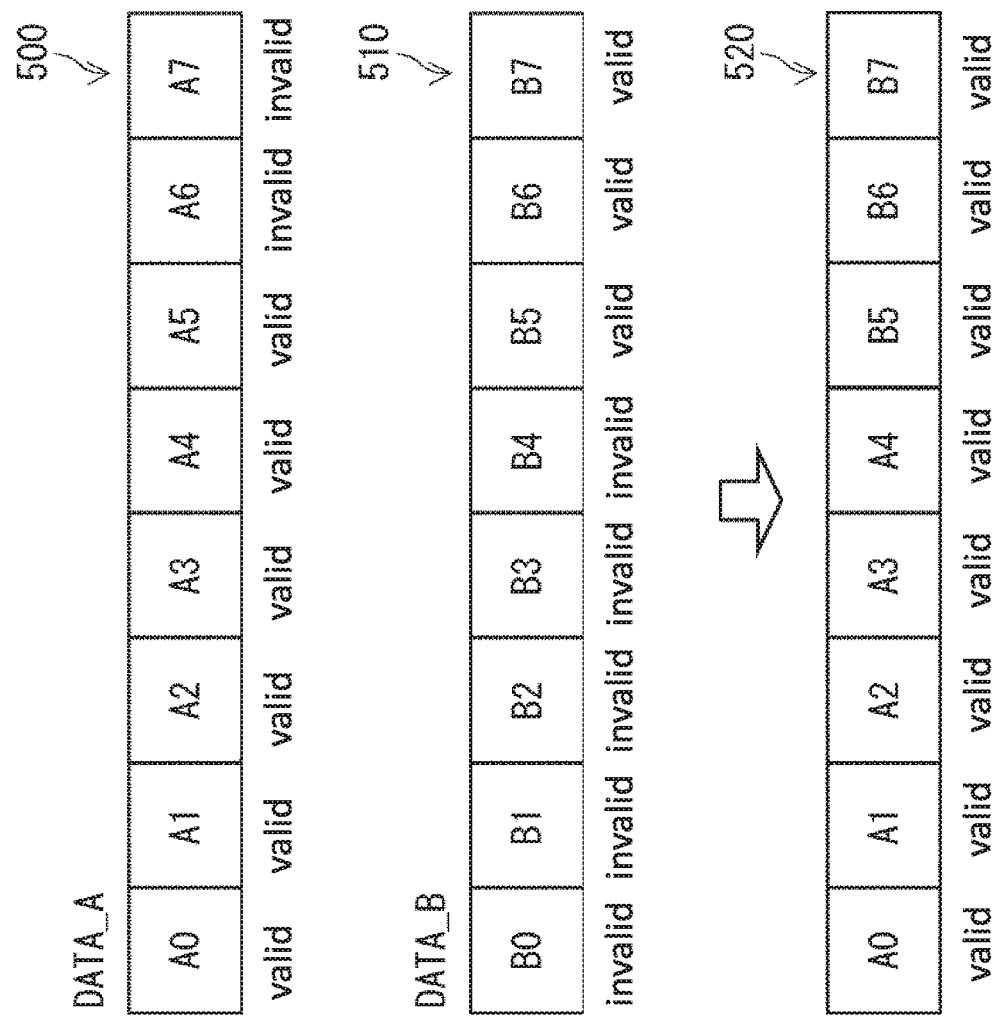
FIG. 7 is a schematic diagram showing the write data stored in a sub memory.

FIG. 7 shows write data stored in the sub memory 211. When a write request for the write data 500 having the new address as a write destination is received, the sub memory 211 stores the write data 500. It is assumed that the ECC generation unit 216 can generate the ECC to be stored in the main memory 30 when all the flags of the eight blocks of write data are "valid".

Next, it is assumed that a write request of the write data 510 having the same write destination address as the write destination address of the write request of the write data 500 is received. In this case, the data A5 to A7 of the write data 500 stored in the sub memory 211 are overwritten with the data B5 to B7 of the block whose flag is "valid" in the write data 510. The write data 520 after overwriting is composed of data A0 to A4 and data B5 to B7. As described above, in the present embodiment, the valid data in the write data 500 and the valid data in the write data 510 are merged in the sub memory 211.

Figure 8:
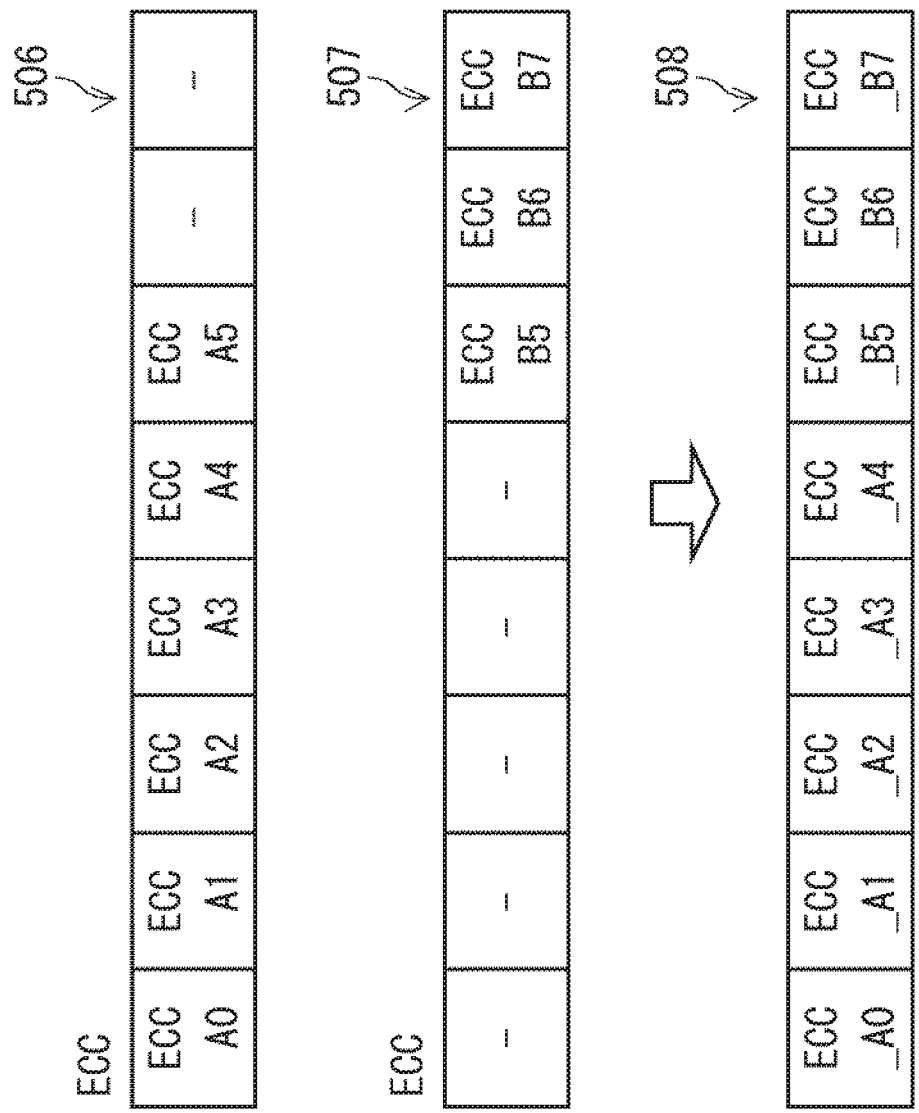
FIG. 8 is a schematic diagram showing ECC stored in a sub memory.

FIG. 8 shows ECC stored in the sub memory 213. The ECC generation unit 212 generates ECC 506 for the write data 500, and stores the generated ECC in the sub memory 213. The ECC 506 includes ECC_A0-A5 generated for the each block of data A0-A5. The ECC generation unit 212 generates ECC 507 for the write data 510. The ECC 507 includes ECC_B5-B7 generated for the each block of data B5-B7. ECC 508 composed of ECC_A0 to ECC_A4 and ECC_B5 to ECC_B7 is obtained by overwriting ECC 506 stored in the sub memory 213 with ECC 507. It is possible to verify whether each block of the write data 520 (FIG. 7) stored in the sub memory 211 includes an error and to correct the error by using this ECC 508.

<Operation Procedure>

Figure 9:
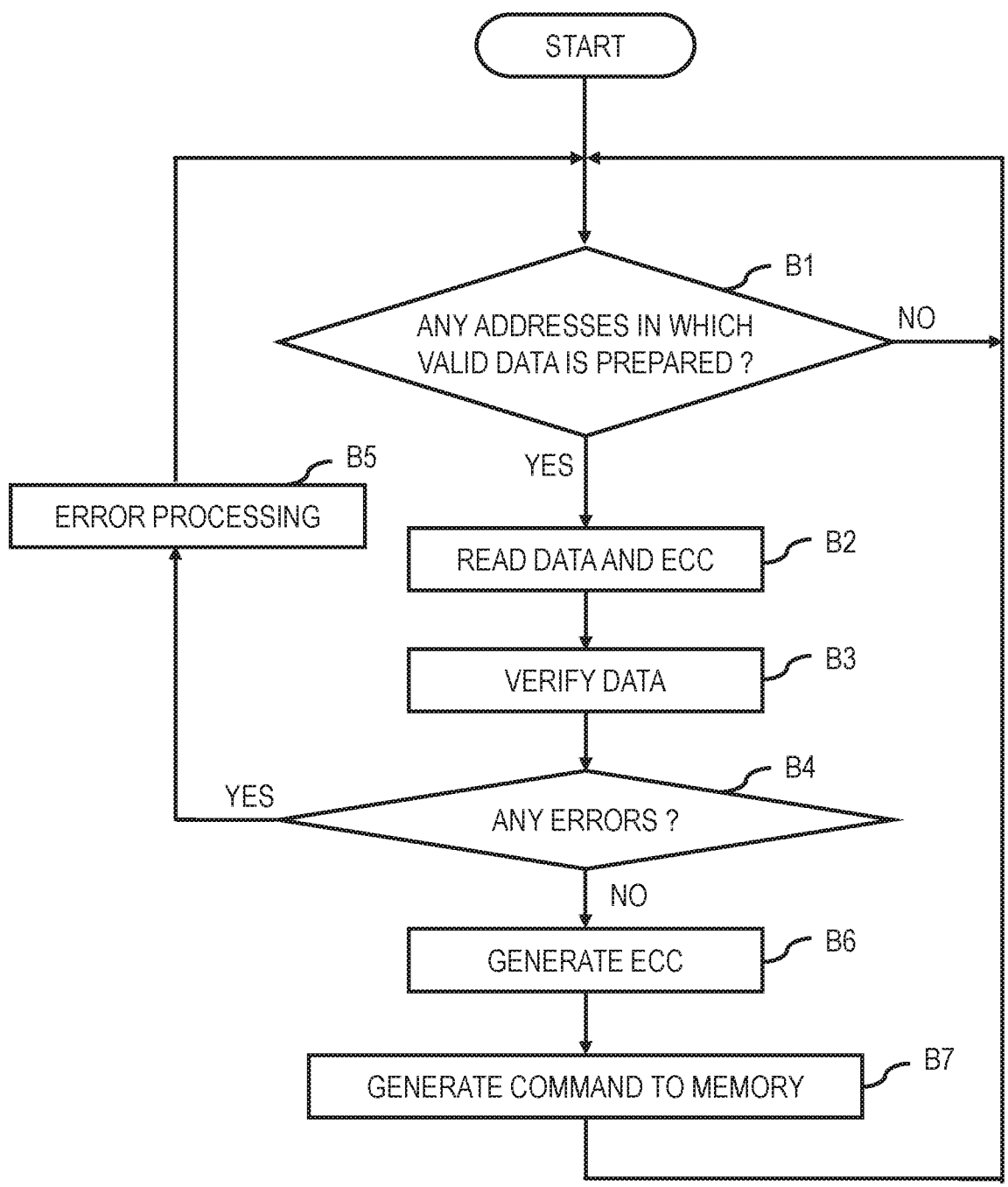
FIG. 9 is a flow chart showing the operation procedure.

FIG. 9 shows an operation procedure. The memory controller 20 receives a write request from the master 11 via the bus. When there is no entry for storing the write data corresponding to the address of the write destination of the write request in the sub memory 211 in the memory controller 20, the write data is temporarily stored in the sub memory 211. When there is already an entry for storing write data corresponding to the address of the write destination in the sub memory 211, the data of the block corresponding to the valid data in the write data, out of the data stored in the sub memory 211, is overwritten with the valid data of the write data. The ECC generation unit 212 generates ECC based on the valid data portion in the write data and stores the generated ECC in the sub memory 213.

When the write request is received, the sub memory controller 214 refers to the sub memory 211 and determines whether there is an address of the main memory 30 in which valid data is prepared (step B1). For example, in step B1, the sub memory controller 214 checks whether there is an entry in which all the flags of each block of the sub memory 211 are "valid". When there is an entry in which the flags of all the blocks are "valid", the sub memory controller 214 determines that there is an address of the main memory 30 in which valid data is prepared.

If determining that there is an address of the main memory 30 in which the valid data is prepared in step B1, the sub memory controller 214 reads the write data from the sub memory 211, and reads ECC corresponding to the read write data from the sub memory 213 (step B2). In the present embodiment, as described above, since a plurality of write data including invalid data are merged in the sub memory 211, it is not necessary to merge a plurality of write data after reading from the sub memory 211.

The ECC check unit 215 verifies the data of each block of the write data read in step B2 using the ECC read in step B2 (step B3). The ECC check unit 215, for example, verifies the data A0 in the write data shown in FIG. 7 using ECC_A0 in ECC 508 shown in FIG. 8. The ECC check unit 215 verifies each of the data A1 to A4 and the data B4 to B7 of the write data using ECC_A0 to ECC_A4 and ECC_B4 to ECC_B7 of ECC 508. When there is an error in any block in the write data and the error can be corrected using ECC of the corresponding block, the ECC check unit 215 corrects the data of the block. The ECC check unit 215 outputs the verification result to the sub memory controller 214.

The sub memory controller 214 determines whether an error has occurred in the write data (step B4). If determining that an error has occurred, the sub memory controller 214 performs an error processing (step B5). Step B5 may be the same as the step A5 of FIG. 3.

If determining that no error has occurred in step B4, the sub memory controller 214 outputs the read write data to the ECC generation unit 216. The ECC generation unit 216 generates ECC based on the write data (step B6). The command issuing unit 23 generates a command to write data obtained by adding the ECC generated in step B6 to the write data into the main memory 30, and outputs the generated command to the main memory 30 (step B7).

In the present embodiment, the write data comprises a plurality of blocks, and the blocks corresponding to the valid data in the plurality of write data are merged in the sub memory 211. The ECC generation unit 212 generates ECC of each block corresponding to the valid data in the write data and stores the generated ECC in the sub memory 213. Even when the ECC stored in the sub memory 213 is overwritten with the newly generated ECC, the data of each block of write data in the sub memory 211 can be verified using the ECC stored in the sub memory 213 by making the generation unit of ECC generated by the ECC generation unit 212 correspond to the block of write data. In the first embodiment, a plurality of write data having the same write destination address is respectively stored in separate entry in the sub memory 211. In this embodiment, only one entry is required to store write data for an address of a writing destination, and the number of entries (memory capacity) required for the sub memory 211 can be reduced compared to the first embodiment.

Third Embodiment

Next, third embodiment will be described. In the first and second embodiments, the ECC generation unit 216 generates ECC when data necessary for generating ECC to be stored in the main memory 30 is prepared in the sub memory 211. In this case, when the master 11 (FIG. 1) does not output a plurality of write requests having the same write destination address, the data necessary for generating the ECC to be stored in the main memory 30 is not prepared, and the time required to store the write data in the main memory 30 becomes longer. In the present embodiment, when a predetermined condition is satisfied, the memory controller 20 performs read-modify-write without waiting for a write request having the same write destination address to generate ECC to be stored in the main memory 30. The other points may be the same as the first or second embodiment.

Figure 10:
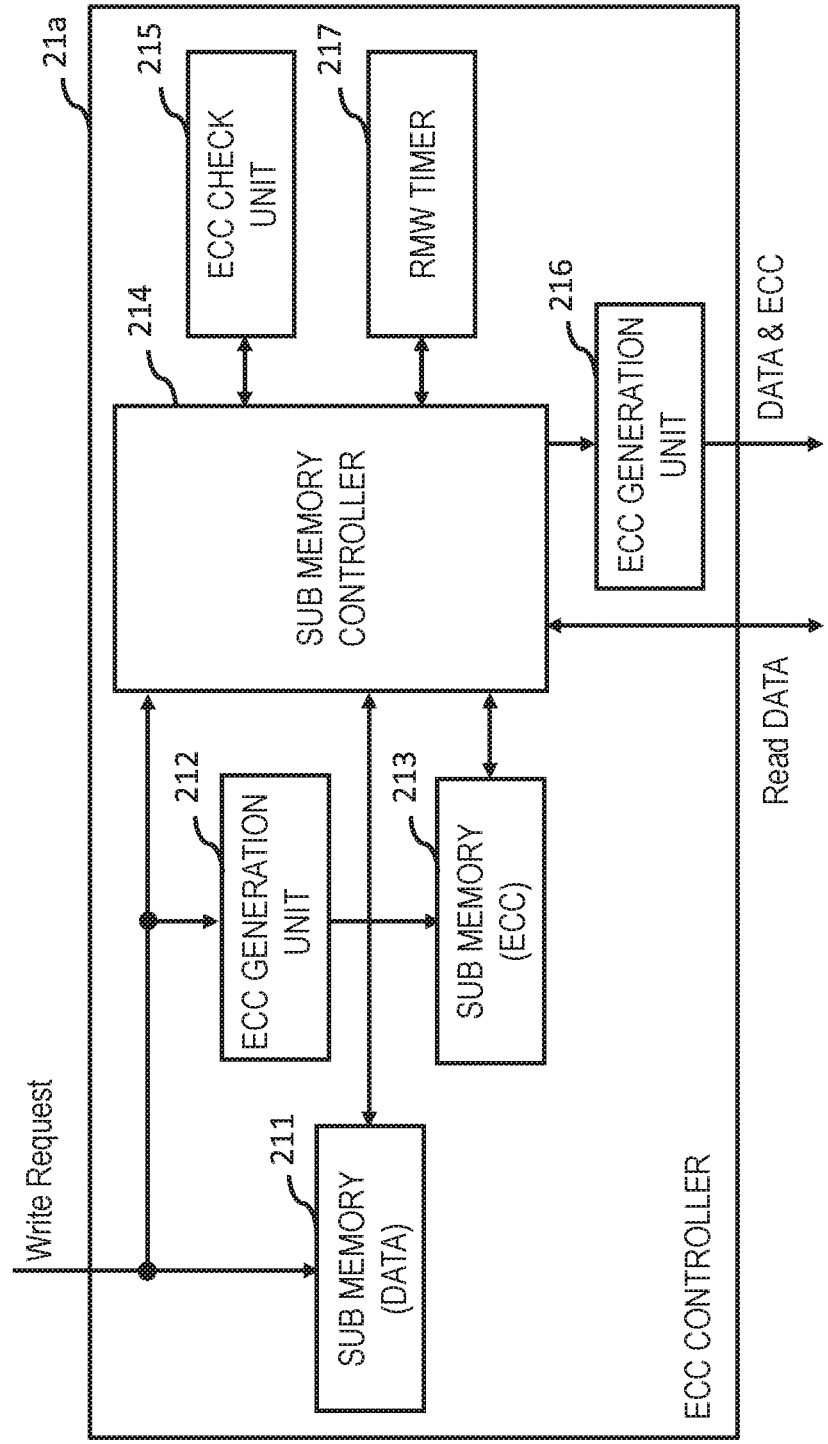
FIG. 10 is a block diagram showing a configuration example of the ECC controller used in a third embodiment.

FIG. 10 shows a configuration example of ECC controller used in the present embodiment. The ECC controller 21a used in the present embodiment includes an RMW timer 217 in addition to the configuration of the ECC controller 21 shown in FIG. 2. In the present embodiment, when a predetermined condition is satisfied, the sub memory controller 214 reads the data of write destination address of the write data from the main memory 30 through the command issuing unit 23 (FIG. 2). The sub memory controller 214 merges the data read from the main memory 30 and the valid data in the write data stored in the sub memory 211, and outputs the merged valid data to ECC generation unit 216.

The RMW timer 217 starts time measurement when a write request is received, and times out after a predetermined time has elapsed. The RMW timer 217, for example, times out after a predetermined time has elapsed from receiving a first write request for each write destination address. Alternatively, the RMW timer 217 may time out after a predetermined time has elapsed from receiving a last write request for each write destination address. When the RMW timer 217 times out, the sub memory controller 214 determines that a predetermined condition is satisfied.

<Operation Procedure>

Figure 11:
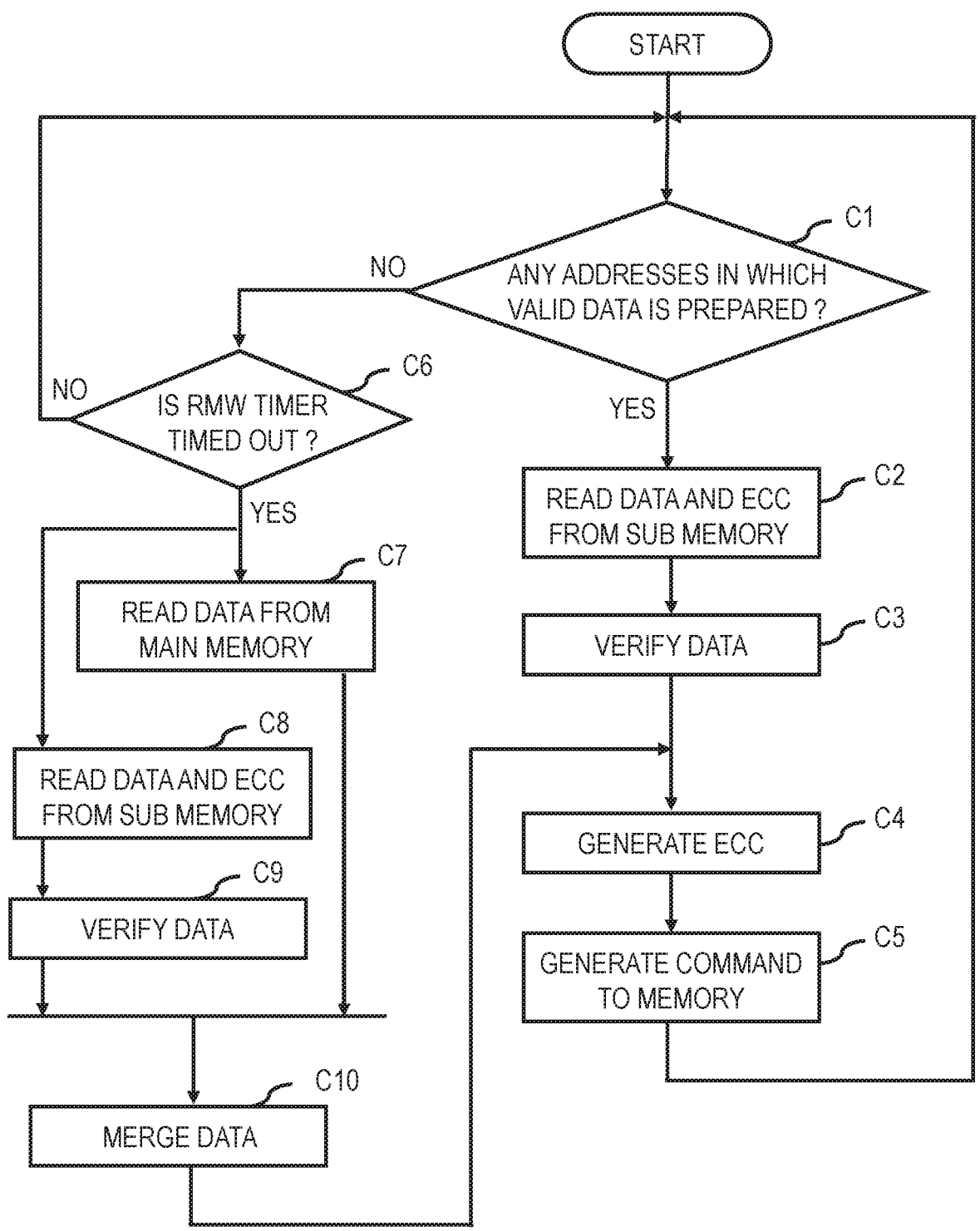
FIG. 11 is a flow chart showing the operation procedure.

FIG. 11 shows an operation procedure. The memory controller 20 receives a write request from the master 11 via the bus. The sub memory 211 in the memory controller 20 temporarily stores write data. The ECC generation unit 212 generates ECC based on the write data and stores the generated ECC in the sub memory 213.

When the write request is received, the sub memory controller 214 refers to the sub memory 211 and determines whether there is an address of the main memory 30 in which valid data is prepared (step C1). For example, in step C1, the sub memory controller 214 determines whether data having a predetermined data width, which is a generation unit of ECC in the ECC generation unit 216, is obtained when valid data in a plurality of write data of the same write destination address stored in the sub memory 211 are merged. When determining that data having a predetermined data width can be obtained by merging the valid data in a plurality of write data, the sub memory controller 214 determines that there is an address of the main memory 30 in which the valid data is prepared.

When determining that there is an address of the main memory 30 in which the valid data is prepared in step C1, the sub memory controller 214 reads the write data to be merged from the sub memory 211, and reads ECC corresponding to the write data from the sub memory 213 (step C2). The ECC check unit 215 verifies the write data read in step C2 using the ECC read in step C2 (step C3). When there is an error in the write data and the error can be corrected using ECC, the ECC check unit 215 corrects the write data. The ECC check unit 215 outputs the verification result to the sub memory controller 214.

When no error has occurred in the write data, the sub memory controller 214 merges the read valid data in the write data and outputs the merged valid data to the ECC generation unit 216. When an error has occurred in the write data, the sub memory controller 214 may perform an error processing. The ECC generation unit 216 generates ECC based on the merged valid data (step C4). The command issuing unit 23 generates a command to write data obtained by adding the ECC generated in step C4 to the merged valid data into the main memory 30, and outputs the generated command to the main memory 30 (step C5). The operation of step C1-C5 may be the same as the operation of step A1-A4 and A6-A9 in FIG. 3. Alternatively, the operation of step C1-C5 may be the same as the operation of step B1-B4, B6, and B7 in FIG. 9.

If determining that there is no address in which the valid data is prepared in step C1, the sub memory controller 214 determines whether the RMW timer 217 has timed out (step C6). If it the sub memory controller 214 determines that the RMW timer 217 has not timed out in step C6, the process returns to step C1. If determining that the RMW timer 217 has timed out in step C6, the sub memory controller 214 reads data from the main memory 30 (step C7). When write data including invalid data, for example, in which the address X is a write destination address, is stored in the sub memory 211, the sub memory controller 214 obtains the data of the address X from the main memory 30 through the command issuing unit 23 in step C7.

The sub memory controller 214 reads write data from the sub memory 211 and reads ECC from the sub memory 213 in parallel with step C7 (step C8). The ECC check unit 215 verifies the write data read in step C8 using the ECC read in step C8 (step C9). When there is an error in the write data and the error can be corrected using the ECC, the ECC check unit 215 corrects the write data. The ECC check unit 215 outputs the verification result to the sub memory controller 214.

When no error has occurred in the write data, the sub memory controller 214 merges the valid data in the read write data and the data read from the main memory 30 in step C7, and outputs the merged data to the ECC generation unit 216. When an error has occurred in the write data, the sub memory controller 214 may perform an error processing. The ECC generation unit 216 generates ECC based on the merged data in step C4. The command issuing unit 23 generates a command to write data obtained by adding the ECC generated by the ECC generation unit 216 to the merged data into the main memory 30, and outputs the generated command to the main memory 30 in step C5.

In the present embodiment, when the RMW timer 217 times out, the sub memory controller 214 performs the same operation as the normal read-modify-write, and merges the data read from the main memory 30 and the write data including the invalid data. In the present embodiment, after a predetermined time has elapsed from storing the write data in the sub memory 211, the data including the write data can be written into the main memory 30, and it is possible to suppress stay of write data in the sub memory 211. Therefore, in the present embodiment, the memory capacity required for the sub memory 211 can be reduced. Further, in the present embodiment, since it is expected that the write data is written into the main memory 30 after a predetermined time has elapsed, it is possible to estimate the performance quantitatively.

Fourth Embodiment

Figure 12:
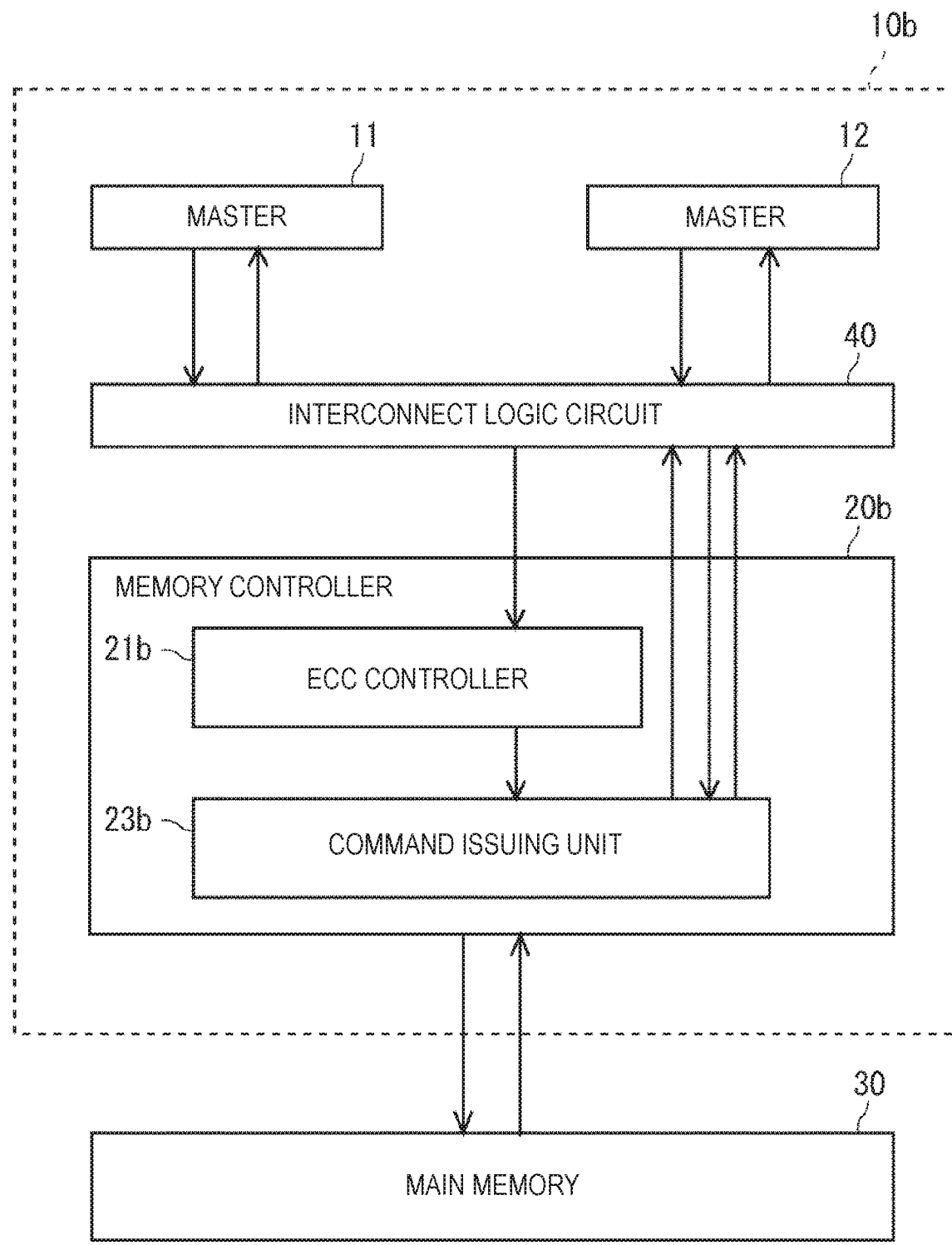
FIG. 12 is a diagram showing a semiconductor device according to a fourth embodiment.

Next, fourth embodiment will be described. FIG. 12 shows a semiconductor device according to the present embodiment. The semiconductor device 10b according to the present embodiment includes a master 11, a master 12, a memory controller 20b, a main memory 30, and an interconnect logic circuit 40. The masters 11 and 12 are bus masters and output access requests to the main memory 30. The interconnect logic circuit 40 receives the access requests issued by the masters 11 and 12 via the corresponding buses. The interconnect logic circuit 40 selectively outputs the access requests output from the masters 11 and 12 to the memory controller 20b.

The interconnect logic circuit 40 is, for example, a bus arbiter, and arbitrates access requests input from a plurality of masters. When receiving an access request from the masters 11 and 12, the interconnect logic circuit 40, for example, may output the access request issued by the high-priority master to the memory controller 20b according to the priority set for each master. When obtaining a response to the access request output to the memory controller 20b, the interconnect logic circuit 40 selects the access request issued by the master having the next highest priority and outputs the access request to the memory controller 20b.

Although FIG. 12 shows an example in which the semiconductor device 10b has two masters, the number of masters is not particularly limited if the semiconductor device 10b has at least one master for issuing access requests for the main memory 30 to the memory controller 20b. In the present embodiment, the semiconductor device 10b may have three or more masters, and the semiconductor device 10b may have one master. When the number of masters is one, the interconnect logic circuit 40 can be omitted.

<Interconnect logic Circuit>

Figure 13:
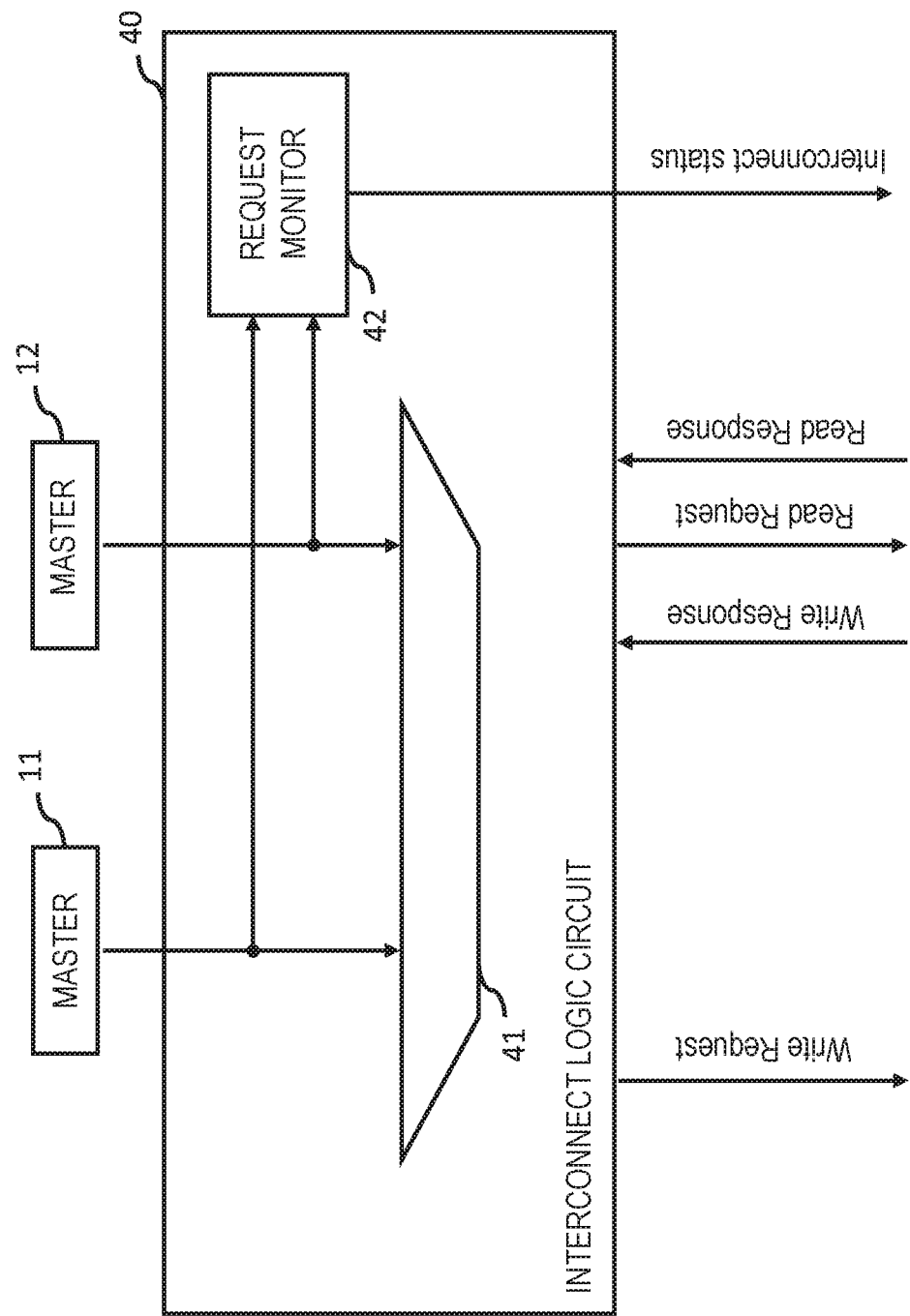
FIG. 13 is a block diagram showing a configuration example of the interconnect logic circuit.

FIG. 13 shows a configuration example of the interconnect logic circuit 40. The interconnect logic circuit 40 includes an arbiter 41 and a request monitor (request monitoring unit) 42. The arbiter 41 selectively outputs the access requests output from the masters 11 and 12 to the memory controller 20b. The request monitor 42 monitors access requests output from the masters 11 and 12. The request monitor 42 outputs the interconnect status indicating the issuance status of the memory access requests of the masters 11 and 12 to the memory controller 20b. The request monitor 42 is not necessarily included in the interconnect logic circuit 40, and may be provided outside of the interconnect logic circuit 40.

<Memory Controller>

Figure 14:
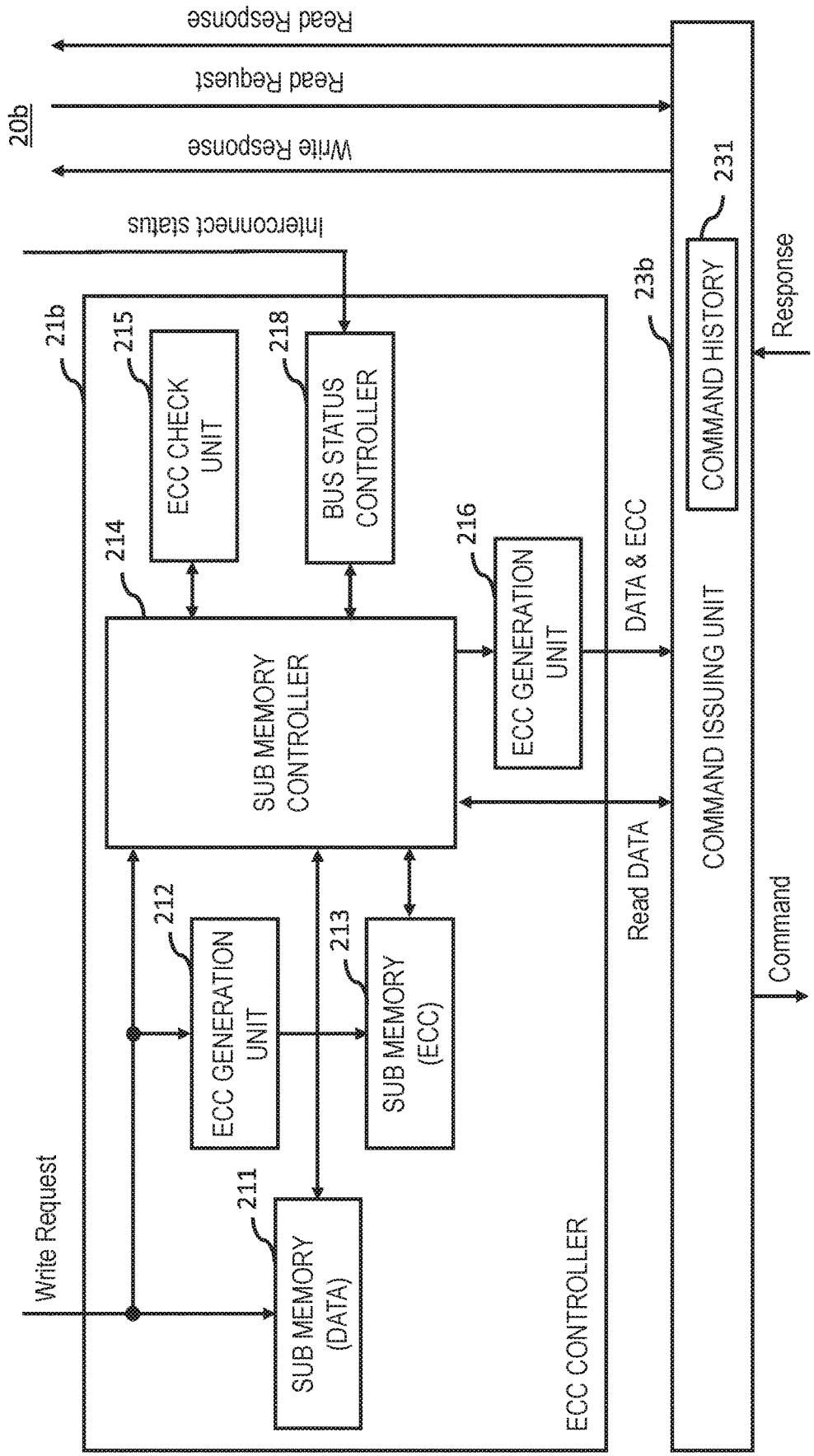
FIG. 14 is a block diagram showing a configuration example of the memory controller.

FIG. 14 shows a configuration example of the memory controller 20b. The memory controller 20b includes an ECC controller 21b and a command issuing unit 23b. The ECC controller 21b has a bus status controller 218 in addition to the configuration of the ECC controller 21 shown in FIG. 2. The ECC controller 21b may further include an RMW timer 217 (FIG. 10). In the present embodiment, similarly to the third embodiment, when a predetermined condition is satisfied, the sub memory controller 214 performs read-modify-write without waiting for a write request having the same write destination address, and generates the ECC to be stored in the main memory 30.

The bus status controller 218 obtains the interconnect status from the request monitor 42. The sub memory controller 214 obtains the issuance status of the memory access request of the masters 11 and 12 through the bus status controller 218, and determines whether a predetermined condition for executing the read-modify-write is satisfied in accordance with the issuance status of the memory access request.

For example, when the interconnect logic circuit 40 receives a memory access request output from at least one of the masters 11 and 12, the sub memory controller 214 waits for a write request having the same write destination address. For example, when the interconnect logic circuit 40 does not receive a memory access request output from at least one of the masters 11 and 12, the sub memory controller 214 determines that a predetermined condition is satisfied. In this case, the sub memory controller 214 merges the data read from the main memory 30 and the write data read from the sub memory 211 in the same procedure as in step C7 to C10 in FIG. 11.

When a new write request is received, the sub memory controller 214 may determine whether the write data having the same write destination address as the write destination address of the newly received write request is stored in the sub memory 211. When the write data which has the same write destination address is not stored in the sub memory 211, the sub memory controller 214 may determine that a predetermined condition is satisfied. In this case, the sub memory controller 214 may read data from the main memory 30 in the same procedure as in step C7 in FIG. 11, and merge the read data and the valid data in the write data.

The command issuing unit 23*b* includes a command history storage unit 231. The command history storage unit 231 stores a history of memory access commands issued by the command issuing unit 23. The command history storage unit 231 stores, for example, the history of the last three commands. It is possible to know which bank of the main memory 30 has been accessed by referring to the command history storage unit 231.

For example, in a memory device such as a DDR, a penalty cycle between accesses is determined depending on a bank address of a last access and a next access. Thus, the access time may vary depending on the combination of the bank accessed next and the bank accessed last. The sub memory controller 214 may estimate the access time based on the history stored in the command history storage unit 231, and then determine write data to be written into the main memory 30 next.

For example, the sub memory controller 214 calculates an access time to write the write data into the main memory 30 for each of the write data stored in the sub memory 211 including the write data requiring the read-modify-write. The sub memory controller 214 selects the write data having the smallest penalty, performs read-modify-write as necessary, causes the ECC generation unit 216 to generate ECC, and causes the command issuing unit 23 to issue a command to write the data in which the ECC is added to the write data into the main memory 30. In this way, it is possible to realize efficient memory access according to the situation.

Figure 15:
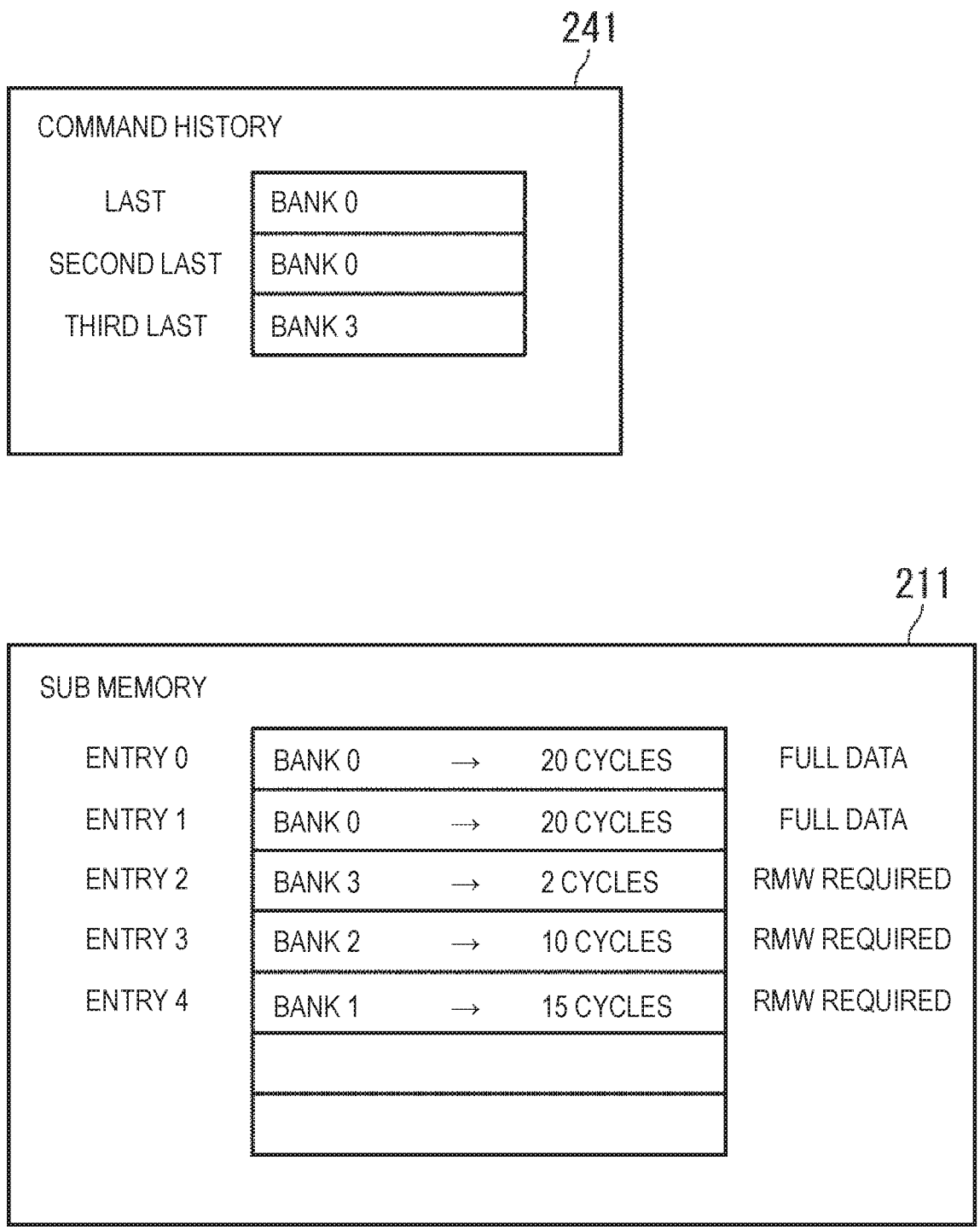
FIG. 15 is a schematic diagram showing the history of the command and the data example of the write data.

FIG. 15 shows a history stored in the command history storage unit 231 and a data example of write data stored in the sub memory 211. The command history storage unit 231 stores history indicating that, for example, the last memory access is an access to bank 0, the second last memory access is to an access to bank 0, and the third last memory access is to an access to bank 3. The sub memory 211 stores a total of five write data from entry 0 to entry 4. Write data stored in the entries 0 and 1 are the write data which does not include invalid data, or the write data which becomes data having a predetermined data width, which is a generation unit of ECC to be stored in the main memory 30 by merging with write data of another entry. On the other hand, the write data stored in the entries 2 to 4 includes invalid data, and is write data that requires a read-modify-write operation in order to write the write data in the main memory 30.

It is assumed that the bank in which the addresses of the write destination of the write data stored in the entries 0 and 1 of the sub memory 211 exists are the bank 0, and the bank in which the address of the write destination of the write data stored in the entry 2 exists is the bank 3. It is assumed that the bank in which the address of the write destination of the write data stored in the entry 3 exists is the bank 2, and the bank in which the address of the write destination of the write data stored in the entry 4 exists is the bank 1.

The sub memory controller 214 calculates the access time when writing the write data stored in each entry into the main memory 30 based on the bank of the access destination of the write data stored in each entry and the bank of the access destination of the past memory access stored in the command history storage unit 231. For example, when the write data stored in the entry 0 and 1 are written into the main memory 30 next, the sub memory controller 214 calculates that 20 cycles are required for writing. The sub memory controller 214 calculates that two cycles are required for writing when writing the write data stored in the entry 2 into the main memory 30 next, and calculates that 10 cycles are required for writing when writing the write data stored in the entry 3 to the main memory 30 next. The sub memory controller 214 calculates that 15 cycles are required for writing when writing the write data stored in the entry 4 into the main memory 30 next.

Based on the access time calculated above, the sub memory controller 214 determines which write data is to be written into the main memory 30 next. In the above case, the number of cycles required for writing is the smallest when writing the write data stored in the entry 2 in the sub memory 211 into the main memory 30. In this case, the sub memory controller 214 obtains the data of write destination address of the write data from the bank 3 in the main memory 30, and merges the obtained write data with the write data stored in the entry 3. The sub memory controller 214 outputs the merged data to the ECC generation unit 216, and the ECC generation unit 216 generates ECC of the merged data. The command issuing unit 23 issues a command to write data obtained by adding ECC to the merged data into the main memory 30 to write the write data stored in the entry 3 into the main memory 30.

In the present embodiment, the sub memory controller 214 determines whether the condition for executing the read-modify-write is satisfied in accordance with the issuance status of the access request from the master. For example, when the master has not issued an access request, it is expected that the interconnect logic circuit 40 does not output the next write request to the memory controller 20. The interconnect logic circuit 40 output the expectation that next write request is not issued to the memory controller 20. In this case, the sub memory controller 214 performs read-modify-write without waiting for a write request having the same write destination address, and obtains data necessary for generating ECC to be stored in the main memory 30. When the master does not output the access request, executing the read-modify-write may complete the processing in a shorter time than merging the write data. In such a case, by executing the read-modify-write, it is possible to suppress stay of write data in the sub memory 211 for a long time.

In the present embodiment, the sub memory controller 214 determines whether the condition for executing the read-modify-write is satisfied in accordance with whether the write data having the same write destination address as the write destination address of the newly received write request is stored in the sub memory 211. For example, when write data is not stored in the sub memory 211, the sub memory controller 214 performs read-modify-write without waiting for a write request having the same write destination address, and obtains data necessary for generating ECC stored in the main memory 30. In this way, efficient memory access can be realized.

In the present embodiment, the sub memory controller 214 determines write data to be written into the main memory 30 next based on the history stored in the command history storage unit 231. For example, the sub memory controller 214 determines the write data which requires the shortest time to complete writing of the data, out of the write data stored in the sub memory 211, as the write data to be written to the main memory 30 next. In this way, it is possible to realize efficient memory access according to the issuance status of the command.

Fifth Embodiment

Figure 16:
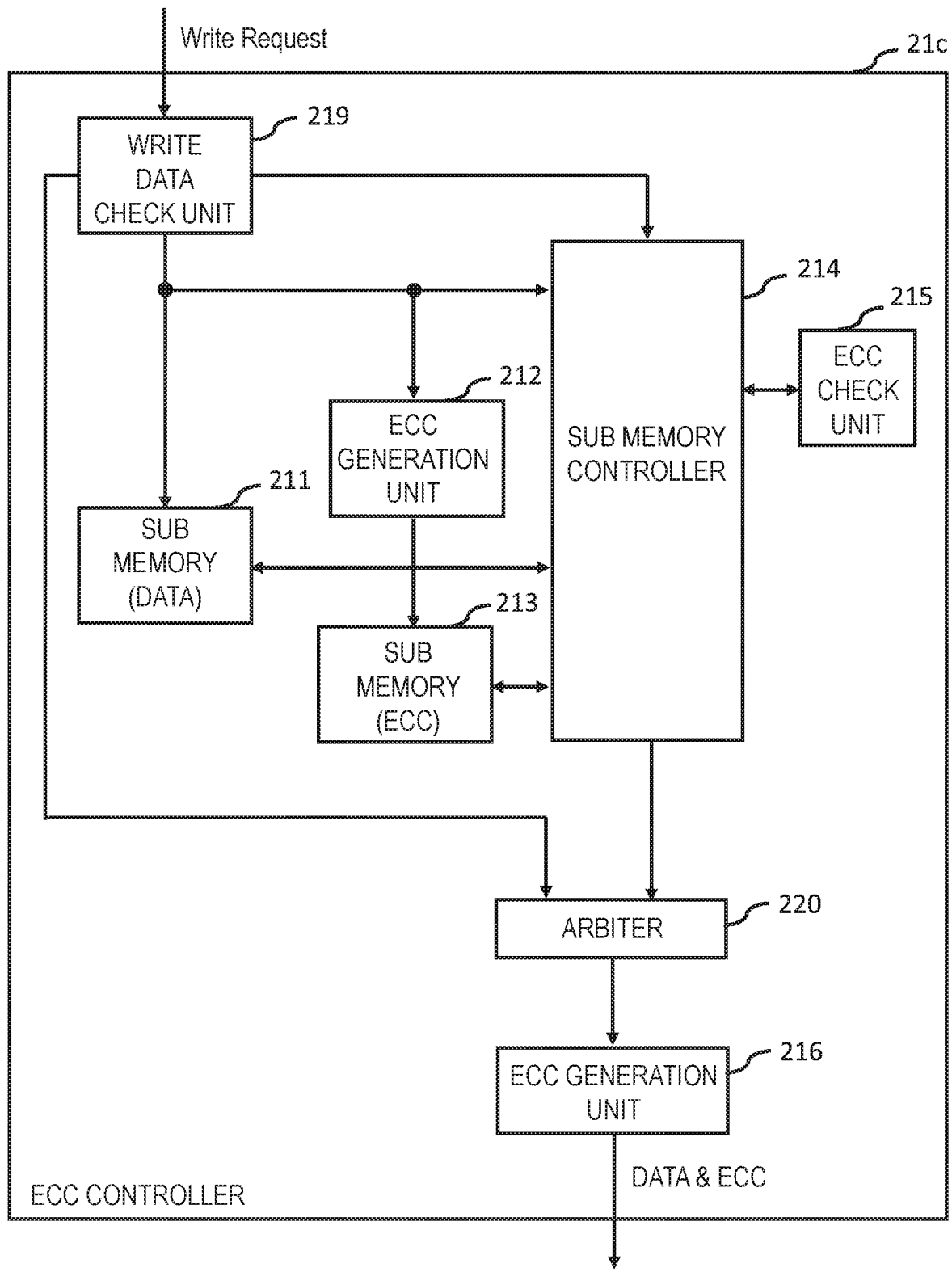
FIG. 16 is a block diagram showing a configuration example of the ECC controller used in a fifth embodiment.

Next, fifth embodiment will be described. FIG. 16 shows a configuration example of an ECC controller used in the present embodiment. The ECC controller 21c used in the present embodiment includes a write data check unit 219 and an arbiter 220 in addition to the configuration of the ECC controller 21 shown in FIG. 2. In the present embodiment, the ECC controller 21c may further include an RMW timer 217 (FIG. 10). The ECC controller 21b may further include a bus status controller 218 (FIG. 14).

When a new write request is received, the write data check unit 219 determines whether the valid data in the write data of the write request is data having a predetermined data width, which is a generation unit of ECC to be stored in the main memory 30. When determining that the data width of the valid data in the write data is smaller than the predetermined data width, write data check unit 219 stores the write data in the sub memory 211. The operation after the write data is stored in the sub memory 211 may be the same as any one of the first to fourth embodiments.

In the present embodiment, if determining that the valid data in the write data is data having a predetermined data width, the write data check unit 219 output the write data to the arbitrator 220, without storing the write data in the sub memory 211. The arbiter 220 selectively outputs the write data output from the sub memory controller 214 and the write data output from the write data check unit 219. The ECC generation unit 216 receives the write data output from the write data check unit 219 via the arbiter 220, and generates ECC based on the write data. The command issuing unit 23 (FIG. 2) issues a command to write data obtained by adding ECC to write data into the main memory 30.

When determining that the valid data in the write data is data having a predetermined data width, write data check unit 219 refers to the sub memory 211 and determines whether write data having the same write destination address as the write destination address of the newly received write request is stored in the sub memory 211. When determining that the write data having the same destination address is stored, the write data check unit 219 requests the sub memory controller 214 to delete the write data having the same write destination address stored in the sub memory 211. The sub memory controller 214 deletes the write data having the same write destination address from the sub memory 211. In this way, it is possible to delete unnecessary write data from the sub memory 211 and to release the entry of the sub memory 211.

In the present embodiment, the write data check unit 219 determines whether the write data is data for which the ECC generation unit 216 can generate ECC. In the present embodiment, when the write data does not include invalid data, and therefore ECC to be written into the main memory 30 can be generated without merging with other write data, the write data is output to the ECC generation unit 216 without being stored in the sub memory 211. In this way, the ECC generation unit 216 can receive the write data without passing through the sub memory 211, and can shorten the time required from the reception of the write request to the generation of the ECC and the issuance of the write command.

In each of the above embodiments, an example in which data stored in the main memory 30 and the sub memory 211 is protected using ECC has been described, but the present disclosure is not limited thereto. The data stored in the main memory 30 and the sub memory 211 may be protected using EDC (Error Detection Code) for error detection instead of ECC for error detection and correction. Alternatively, data stored in the main memory 30 may be protected using ECC, and data stored in the sub memory 211 may be protected using EDC. In the case of using EDC, although error correction cannot be performed, it is possible to determine whether an error is included in the data.

Although the invention made by the inventor has been specifically described based on the embodiment, the present invention is not limited to the embodiment already described, and it is needless to say that various modifications can be made without departing from the gist thereof.

What is claimed is:

1. A semiconductor device comprising:
a master configured to issue memory access requests including i) a first memory access request including a first write request including a first write data and ii) a second memory access request including a second write request including a second write data; and
a memory controller configured to access a main memory according to write destination addresses respectively included in the memory access requests, the write destination addresses corresponding to locations in the main memory,
wherein the memory controller includes:
a first code generation unit configured to 1) receive the first write request including the first write data, 2) generate a first code of the first write data for detecting an error in the first write data corresponding to the first write request, 3) receive the second write request including the second write data, and 4) generate a first code of the second write data for detecting an error in the second write data corresponding to the second write request;
a sub memory including 1) a first sub memory configured to store the first write data and the second write data, and 2) a second sub memory configured to store the first code of the first write data and the first code of the second write data;
a write data verification unit configured to verify whether the error in the first write data exists and whether the error in the second write data exists using the first code of the first write data and the first code of the second write data, respectively; and
a sub memory controller configured to:
determine whether a first write destination address where the first write data is to be written and a second write destination address where the second write data is to be written indicate a same write destination address;
when the first write destination address and the second write destination address indicate the same write destination address, refer to the sub memory to determine whether merging valid data of the first write data and valid data of the second write data to be written into the same write destination address corresponding to a location in the main memory results in merged data having a predetermined data width;

when merging the valid data of the first write data and the valid data of the second write data is determined to result in the merged data having the predetermined data width, read i) the first write data and the second write data from the first sub memory and ii) the first code of the first write data and the first code of the second write data from the second sub memory;

generate and output the merged data when the write data verification unit verifies that the error in the first write data does not exist and the error in the second write data does not exist;

a second code generation unit configured to generate a second code for detecting an error of the merged data and output the merged data and the second code corresponding to the merged data into the same write destination address in the main memory; and a command issuing unit configured to issue a command to write the merged data to which the second code is added into the same write destination address in the main memory, wherein each of the first write data and the second write data includes a plurality of blocks, wherein information indicating valid data or invalid data is set for each block in the first write data according to the first write request and is set for each block in the second write data according to the second write request, wherein the first code generation unit generates i) the first code of the first write data for the blocks of the first write data for which corresponding information indicating the valid data are set and ii) the first code of the second write data for the blocks of the second write data for which corresponding information indicating the valid data are set, wherein the first sub memory includes entries for the respective write destination addresses, wherein when the first write request is received, the sub memory controller checks whether the entries in the first sub memory already include an entry for the same write address, and wherein when the entries in the first sub memory include the entry for the same write address, the sub memory controller overwrites, with the valid data of the first write data of the received first write request, valid data that is already stored in the entry prior to receiving the first write request, and wherein the valid data already stored in the entry prior to receiving the first write request corresponds to the valid data of the first write data of the received first write request.

2. A semiconductor device comprising:

a master configured to issue memory access requests including i) a first memory access request including a first write request including a first write data and ii) a second memory access request including a second write request including a second write data; and a memory controller configured to access a main memory according to write destination addresses respectively included in the memory access requests, the write destination addresses corresponding to locations in the main memory, wherein the memory controller includes:

a first code generation unit configured to 1) receive the first write request including the first write data, 2) generate a first code of the first write data for detecting an error in the first write data corresponding to the first write request, 3) receive the second write request including the second write data, and 4) generate a first code of the second write data for detecting an error in the second write data corresponding to the second write request;

a sub memory including 1) a first sub memory configured to store the first write data and the second write data, and 2) a second sub memory configured to store the first code of the first write data and the first code of the second write data;

a sub memory controller configured to:
  refer to the sub memory to determine whether merging first valid data of the first write data and second valid data of the second write data results in merged data having a predetermined data width, the first write data and the second write data to be written into a same write destination address in the main memory;
  when merging the first valid data and the second valid is determined to result in the merged data having the predetermined data width, read the first write data and the second write data and read, from the sub memory, the first code of the first write data and the first code of the second write data; and
  determine whether each of the first write data and the second write data includes an error by using the first code of the first write data and the first code of the second write data, and output the merged data when it is determined that the first write data and the second write data do not include the error;

a second code generation unit configured to generate a second code for detecting an error of the merged data and output the merged data and the second code corresponding to the merged data to the main memory;

a write data verification unit configured to verify whether the first write data stored in the first sub memory includes the error based on the first code of the first write data stored in the second sub memory and whether the second write data stored in the first sub memory includes the error based on the first code of the second write data stored in the second sub memory; and a command issuing unit configured to issue a command to write the merged data and the second code corresponding to the merged data into the main memory, wherein the memory controller further includes a write data check unit configured to determine, before merging the first valid data of the first write data with the second valid data of the second write data, whether the first valid data in the first write data has the predetermined data width without merging the first valid data of the first write data with the second valid data of the second write data, and wherein when the write data check unit determines that the first valid data in the first write data has the predetermined data width without merging the first valid data of the first write data with the second valid data of the second write data, (1) the first write data is not stored in the first sub memory, (2) the second code generation unit generate the second code based on the first write data, and (3) the command issuing unit issues command to write data obtained by adding the second code to the first write data into the main memory.

3. The semiconductor device according to claim 2, wherein when the write data check unit determines that the first valid data in the first write data has the predetermined data width, the write data check unit further determines whether a pre-existing write data having the same write destination address as the write destination address of the first write data is stored in the first sub memory, and wherein when the write data check unit determines that the pre-existing write data having the same write destination address as the write destination address of the first write data is stored in the first sub memory, the write data check unit requests the sub memory controller to delete the pre-existing write data stored in the first sub memory.

4. A memory controller comprising:
a first sub memory configured to store first write data including first valid data and second write data including second valid data, the first write data and the second write data being respectively included in a first write request and a second write request, the first write request and the second write request being issued by a master, the master being configured to issue a first memory access request including the first write request and a second memory access request including the second write request;
a first code generation unit configured to respectively generate first codes for the first write data and the second write data stored in the first sub memory such that i) one of the first codes is generated to detect a first error in the first write data and ii) another one of the first codes is generated to detect a second error in the second write data;
a second sub memory configured to store the first codes;
a write data verification unit configured to verify whether the first write data stored in the first sub memory includes the first error and the second write data stored in the first sub memory includes the second error based on the first codes stored in the second sub memory;
a sub memory controller configured to:
when the first write request and the second write request are both for a same write destination address corresponding to a location in a main memory, determine whether data having a predetermined data width is obtained by merging the first valid data of the first write data and the second valid data of the second write data;
when the data having the predetermined data width is determined to be obtained by merging the first valid data of the first write data and the second valid data of the second write data, read the first write data and the second write data to be merged from the first sub memory; and
when the write data verification unit determines that the read first write data does not include the first error and the read second write data does not include the second error using the first codes stored in the second sub memory, merge the first valid data of the read first write data and the second valid data of the read second write data to generate the data having the predetermined data width;

a second code generation unit configured to generate a second code to be written into the main memory for detecting an error in the data having the predetermined data width;
and a command issuing unit configured to issue a command to write the data having the predetermined data width and the second code into the same write destination address corresponding to the location in the main memory.

5. The memory controller according to claim 4,
wherein when determining that the first write data includes the first error, the write data verification unit corrects the first write data using the one of the first codes,
wherein the one of the first codes is used to correct a predetermined number of bits of the first error in the first write data,
wherein when determining that the second write data includes the second error, the write data verification unit corrects the second write data using the another one of the first codes, and
wherein the another one of the first codes is used to correct a predetermined number of bits of the second error in the second write data.

6. The memory controller according to claim 5,
wherein when the first error includes more bits than the predetermined number of bits, the first write data cannot be corrected using the one of the first codes,
wherein when the first write data cannot be corrected using the one of the first codes, the write data verification unit outputs information that the first write data includes the first error,
wherein when the second error includes more bits than the predetermined number of bits, the second write data cannot be corrected using the another one of the first codes, and
wherein when the second write data cannot be corrected using the another one of the first codes, the write data verification unit outputs information that the second write data includes the second error.

7. The memory controller according to claim 4,
wherein the sub memory controller performs a first error processing on the first write data when the write data verification unit determines that the first write data includes the first error, and
wherein the sub memory controller performs a second error processing on the second write data when the write data verification unit determines that the second write data includes the second error.

8. The memory controller according to claim 4, wherein the first sub memory stores the first write data in a first entry for the first write request and the second write data in a second entry for the second write request, the first entry being separate from the second entry.

9. The memory controller according to claim 4,
wherein each of the first write data and the second write data includes a plurality of blocks,
wherein information indicating valid data or invalid data is set for each block in the first write data according to the first write request and is set for each block in the second write data according to the second write request, and
wherein the first code generation unit generates the one of the first code for the blocks in the first write data being set based on the information indicating the valid data of the first write data and the another one of the first code for the blocks in the second write data being set based on the information indicating the valid data of the second write data.

10. The memory controller according to claim 4,
wherein when a predetermined condition is satisfied, the sub memory controller reads data from the location in the main memory corresponding to the same write destination address of the first write data and the second write data, and merges the read data and the valid data of the read first write data and the valid data of the read second write data, and
wherein the second code generation unit generates the second code.

11. The memory controller according to claim 10, further comprising a timer,
wherein when the timer times out, the sub memory controller determines that the predetermined condition is satisfied.

12. The memory controller according to claim 10, further comprising a request monitoring unit configured to monitor the first memory access request and the second memory access request issued by the master,
wherein the sub memory controller determines whether the predetermined condition is satisfied in accordance with an issuance status of the first memory access request and an issuance status of the second memory access request of the master.

13. The memory controller according to claim 10, wherein when the first write request is received and pre-existing write data having the same write destination address as the write destination address of the received first write request is not stored in the first sub memory, the sub memory controller determines that the predetermined condition is satisfied.

14. The memory controller according to claim 4,
wherein the memory controller further includes a command history storage unit configured to store a history of commands issued by the command issuing unit, and
wherein the memory controller determines the data to be written into the main memory based on the history of commands stored in the command history storage unit.

15. The memory controller according to claim 4,
wherein the master includes a first master that issues the first memory access request and a second master that issues the second memory access request, and
wherein the first memory access request issued by the first master and the second memory access request issued by the second master are selectively output to the memory controller.

16. The memory controller according to claim 15, further comprising a request monitoring unit which monitors the first memory access request and second memory access request issued respectively by the first master and the second master, wherein the sub memory controller determines whether the sub memory controller merges the first valid data of the first write data and the second valid data of the second write data read from the first sub memory in accordance with an issuance status of the first memory access request and an issuance status of the second memory access request of the master monitored by the request monitoring unit, and when the sub memory controller determines that the sub memory controller does not merge the first valid data of the first write data and the second valid data of the second write data, the sub memory controller reads data of a corresponding write destination address of the first write data and merges the read data and the first valid data in the first write data, and wherein the second code generation unit generates the second code.

* * * * *